(12) United States Patent
Choraku et al.

(10) Patent No.: US 10,877,216 B2
(45) Date of Patent: Dec. 29, 2020

(54) OPTICAL WAVEGUIDE SUBSTRATE, METHOD OF MANUFACTURING OPTICAL WAVEGUIDE SUBSTRATE, AND METHOD OF REPAIRING OPTICAL WAVEGUIDE SUBSTRATE

(71) Applicant: FUJITSU LIMITED, Kawasaki (JP)

(72) Inventors: Kohei Choraku, Yokohama (JP); Akiko Matsui, Meguro (JP); Yoshiyuki Hiroshima, Nakano (JP); Kazuki Takahashi, Kawasaki (JP); Tetsuro Yamada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/379,333

(22) Filed: Apr. 9, 2019

(65) Prior Publication Data
US 2019/0324207 A1    Oct. 24, 2019

(30) Foreign Application Priority Data
Apr. 20, 2018    (JP) .................................. 2018-081090

(51) Int. Cl.
*G02B 6/122*    (2006.01)
*G02B 6/42*    (2006.01)
*G02B 6/13*    (2006.01)

(52) U.S. Cl.
CPC .......... *G02B 6/122* (2013.01); *G02B 6/4214* (2013.01); *G02B 6/13* (2013.01)

(58) Field of Classification Search
None
See application file for complete search history.

(56) References Cited

U.S. PATENT DOCUMENTS 6,020,620 A * 2/2000 Kusakabe ............. H01L 31/105
257/436

FOREIGN PATENT DOCUMENTS

| JP | 2005-037531 | 2/2005 |
| JP | 2005-077644 | 3/2005 |

* cited by examiner

*Primary Examiner* — Jerry Rahll
(74) *Attorney, Agent, or Firm* — Fujitsu Patent Center

(57) ABSTRACT

An optical waveguide substrate includes a substrate that includes a recess, a buffer layer disposed on a bottom surface and a wall surface of the recess, and an optical waveguide disposed inside the recess with the buffer layer interposed therebetween and having a cladding layer disposed on the buffer layer and a core layer disposed inside the cladding layer.

7 Claims, 20 Drawing Sheets

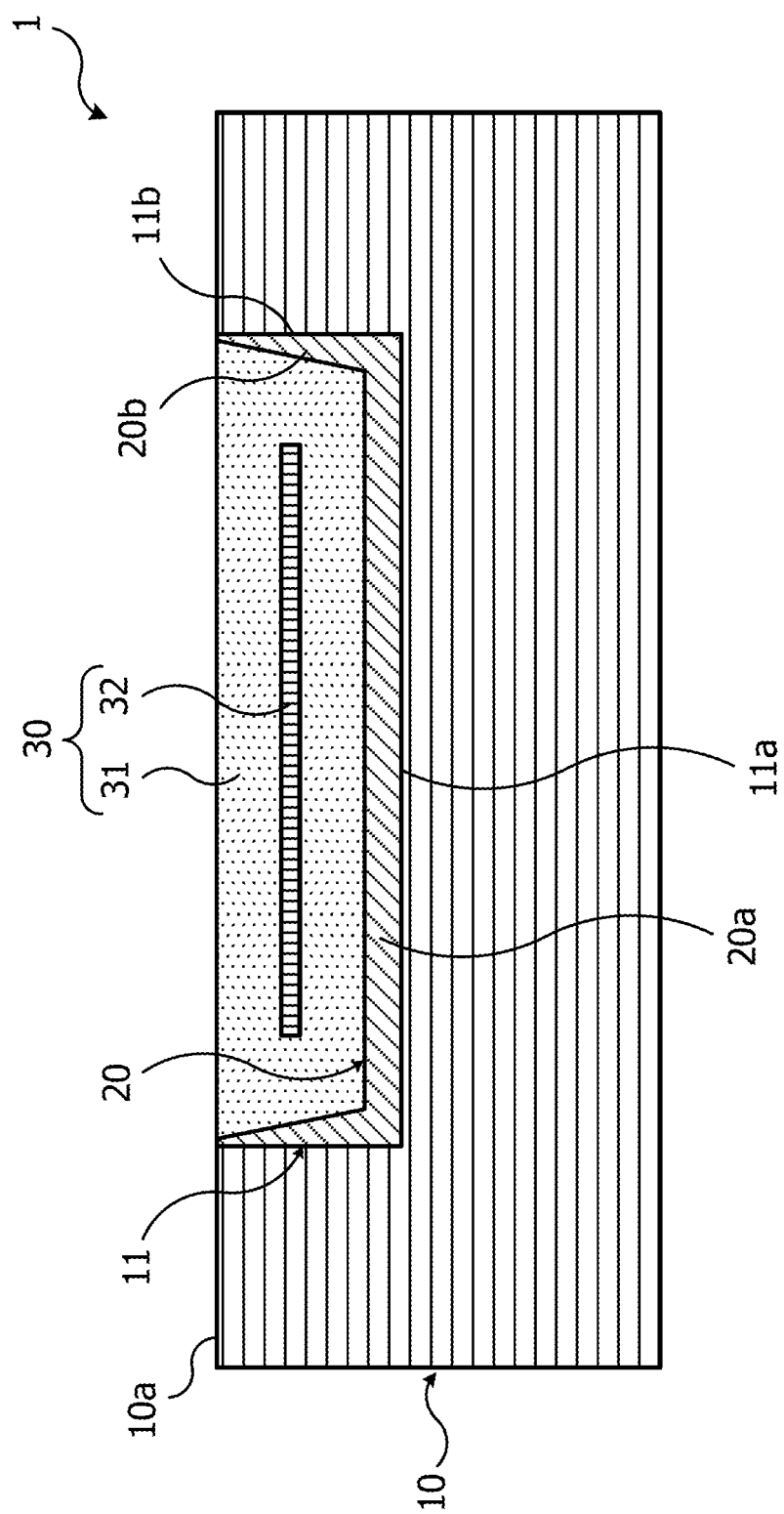

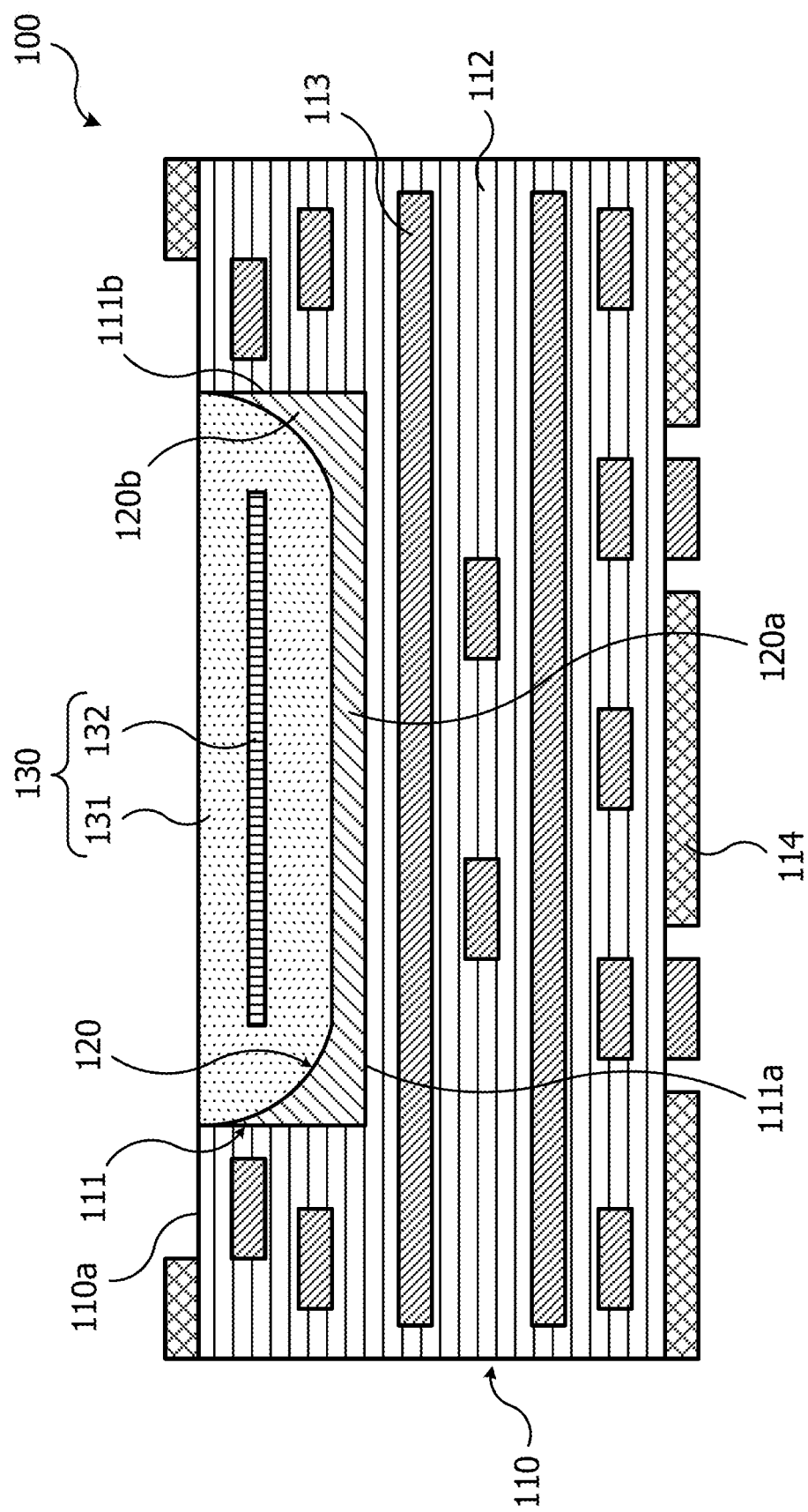

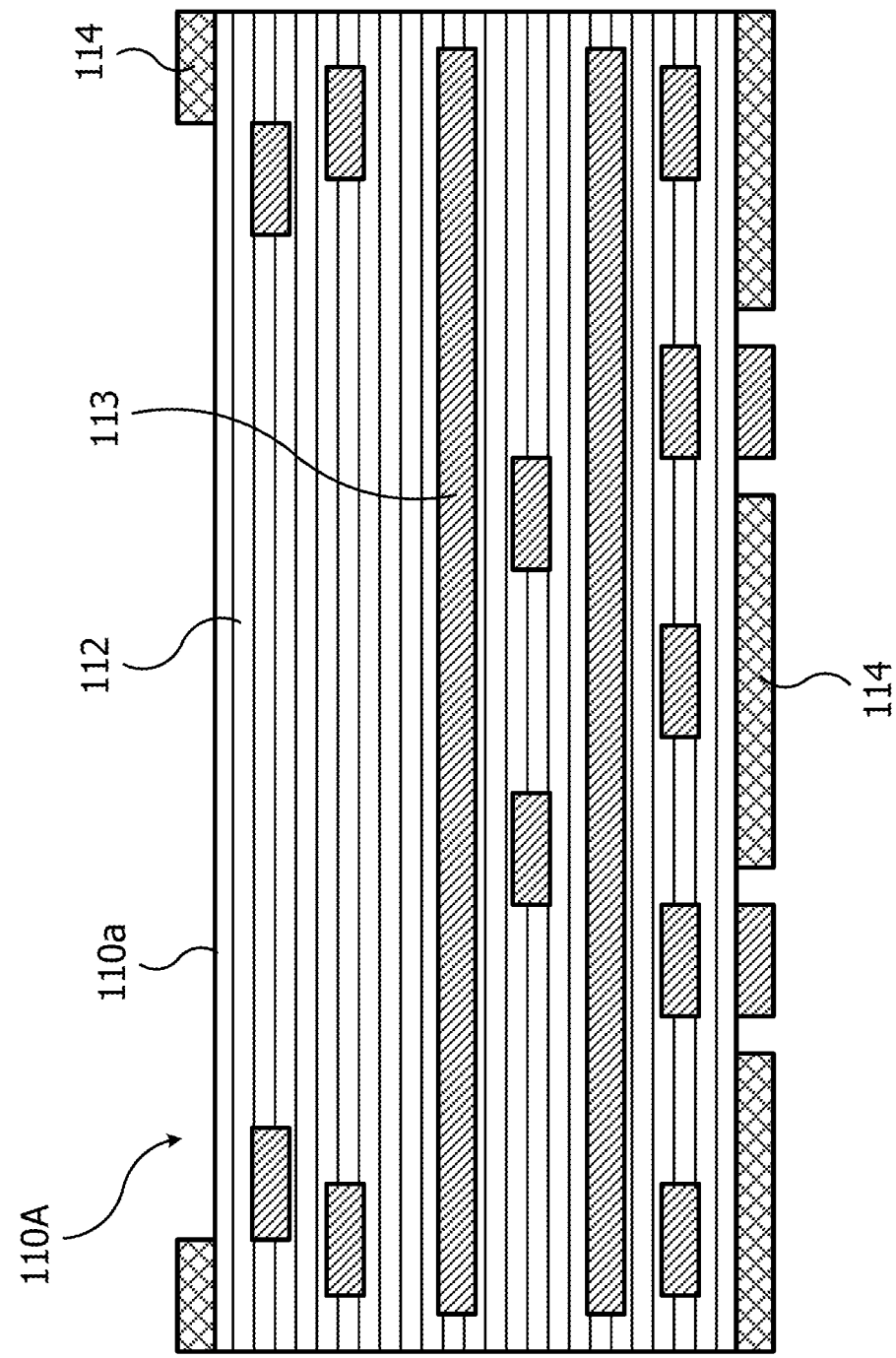

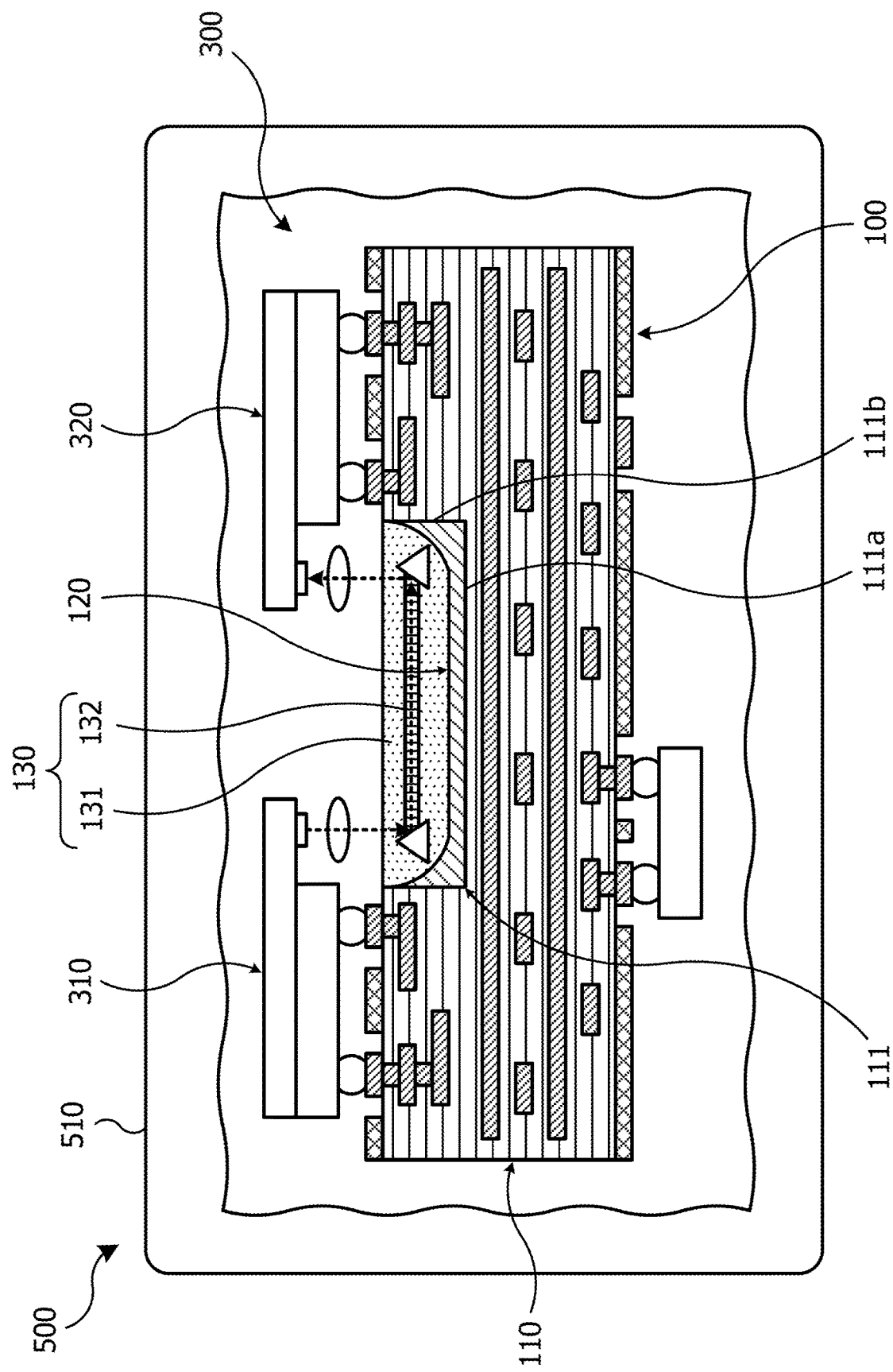

OPTICAL WAVEGUIDE SUBSTRATE, METHOD OF MANUFACTURING OPTICAL WAVEGUIDE SUBSTRATE, AND METHOD OF REPAIRING OPTICAL WAVEGUIDE SUBSTRATE

CROSS-REFERENCE TO RELATED APPLICATION

This application is based upon and claims the benefit of priority of the prior Japanese Patent Application No. 2018-81090, filed on Apr. 20, 2018, the entire contents of which are incorporated herein by reference.

FIELD

The embodiments discussed herein are related to an optical waveguide substrate, a method of manufacturing an optical waveguide substrate, and a method of repairing an optical waveguide substrate.

BACKGROUND

A technique has been known which disposes an optical waveguide having a cladding and a core (also referred to as optical wiring and the like) on a substrate. Regarding such technique, proposed are a structure in which an intermediate layer using a predetermined material is disposed between a substrate and an optical waveguide and a structure in which a relaxing layer using a predetermined material is disposed between a substrate and an optical waveguide as well as on the optical waveguide.

An optical waveguide substrate in which an optical waveguide is disposed on a substrate has a risk that the adhesion between the substrate and the optical waveguide is insufficient, causing peeling or cracking, depending on the combination of materials of the substrate and the optical waveguide. Depending on the combination of materials of the substrate and the optical waveguide, it is possible that peeling or cracking occur between the substrate and the optical waveguide due to the difference in coefficient of thermal expansion between these materials. Such insufficient adhesion and occurrence of peeling or cracking between the substrate and the optical waveguide constitute factors of degrading the quality and reliability of the optical waveguide substrate.

The followings are reference documents.
[Document 1] Japanese Laid-open Patent Publication No. 2005-37531 and
[Document 2] Japanese Laid-open Patent Publication No. 2005-77644.

SUMMARY

According to an aspect of the embodiments, an optical waveguide substrate includes a substrate that includes a recess, a buffer layer disposed on a bottom surface and a wall surface of the recess, and an optical waveguide disposed inside the recess with the buffer layer interposed therebetween and having a cladding layer disposed on the buffer layer and a core layer disposed inside the cladding layer.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of an optical waveguide substrate according to a first embodiment;
FIG. 3 illustrates an example of an optical waveguide substrate according to a second embodiment;
FIG. 4 illustrates an example of a method of forming the optical waveguide substrate according to the second embodiment (Part 1);
FIG. 20 illustrates an optical instrument according to a sixth embodiment.

DESCRIPTION OF EMBODIMENTS

Figure 2A:
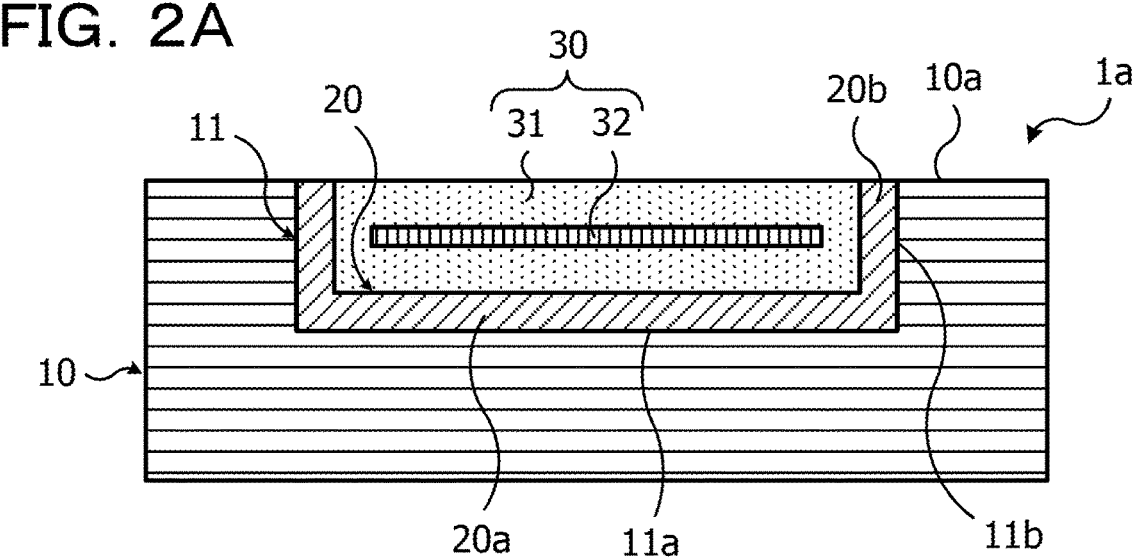
FIGS. 2A to 2C each illustrate modifications of the optical waveguide substrate according to the first embodiment.

Hereinafter, embodiments will be described with reference to the drawings.

First Embodiment

FIG. 1 illustrates an example of an optical waveguide substrate according to a first embodiment. FIG. 1 schematically illustrates a main-part cross-sectional view of the example of the optical waveguide substrate.

The optical waveguide substrate 1 illustrated in FIG. 1 includes: a substrate 10 having a recess 11; a buffer layer 20 disposed on a bottom surface 11a and a wall surface 11b of the recess 11; and an optical waveguide 30 disposed inside the recess 11 with the buffer layer 20 interposed therebetween.

The substrate 10 is for example a circuit substrate in which a conductor pattern including wiring and vias is disposed on a surface, or on the surface and inside, of an insulative base material. In this case, as the base material, used is a resin material, or a resin material such as an epoxy resin containing fibers or cross of glass, carbon, or the like, for example. Alternatively, as the base material, a semiconductor material, a ceramic material, or the like may be used.

In place of a circuit substrate, also usable as the substrate 10 are various substrates including no circuits or conductor patterns functioning as part of circuits, such as resin substrates, resin substrates containing fibers and cross, semiconductor substrates, ceramic substrates, glass substrates, and metal substrates, for example.

The optical waveguide 30 is disposed inside the recess 11 of the substrate 10 with the buffer layer 20 interposed therebetween. The optical waveguide 30 includes: a cladding layer 31; and a core layer 32 disposed inside the cladding layer 31. Although FIG. 1 illustrates a single core layer 32 inside the cladding layer 31, a plurality of core layers 32 may be disposed inside the cladding layer 31. The shape of the core layer 32 is not limited to a straight shape but may be a curved shape or a shape having a curved portion.

As the optical waveguide 30, used is an optical waveguide having a refractive index distribution of graded-index (GI) type, for example. For the core layer 32 of the optical waveguide 30 of GI-type, used is a material containing a resin material, for example, one or two or more of resin materials such as silicone resins, acrylic resins, epoxy resins, polyimide resins, polyolefin resins, and polynorbornene resins. The core layer 32 has such a refractive index distribution that the closer to the central portion, the higher the refractive index is while the closer to the peripheral portion, the lower the refractive index is. For the cladding layer 31 covering the core layer 32, used is a material containing a resin material, for example, one or two or more of resin materials such as silicone resins, acrylic resins, epoxy resins, polyimide resins, polyolefin resins, and polynorbornene resins. For the cladding layer 31, a resin material that makes the refractive index of the cladding layer 31 lower than that of the central portion of the core layer 32 is used.

As the optical waveguide 30, an optical waveguide having a refractive index distribution of step-index (SI) type may be used instead of an optical waveguide having a refractive index distribution of GI-type.

The buffer layer 20 is disposed between the bottom surface 11a and wall surface 11b of the recess 11 of the substrate 10 and the optical waveguide 30 disposed inside the recess 11. The buffer layer 20 has: a portion 20a disposed along the bottom surface 11a; and a portion 20b disposed to rise up from the portion 20a along the wall surface 11b. FIG. 1 illustrates, as an example, a mode in which the film thickness of the portion 20b of the buffer layer 20 (the thickness of the substrate 10 in a plane direction) becomes thinner toward one surface (upper surface) 10a of the substrate 10 in a cross-sectional view.

For the buffer layer 20, used is a material containing a resin material, for example, one or two or more of resin materials such as epoxy resins, phenolic resins, silicone resins, polyimide resins, and polyamide resins. The resin material used for the buffer layer 20 may be of solvent type or non-solvent type, and may be of one-liquid type or two-liquid type. For the buffer layer 20, a photocurable, thermosetting, or thermoplastic resin material is used.

For the buffer layer 20, used is a resin material having a favorable adhesion with the bottom surface 11a and wall surface 11b of the recess 11 of the substrate 10 as well as with the cladding layer 31 of the optical waveguide 30. For the buffer layer 20, used is, for example, a resin material that makes the adhesion between the optical waveguide 30 and the substrate 10 higher than that in the case where the cladding layer 31 of the optical waveguide 30 is disposed in direct contact with the bottom surface 11a and wall surface 11b of the recess 11 of the substrate 10.

For the buffer layer 20, used is a resin material that makes the buffer layer 20 have a coefficient of thermal expansion $CTE_B$ between the coefficient of thermal expansion $CTE_P$ of the substrate 10 (for example, the base material) and the coefficient of thermal expansion $CTE_C$ of the cladding layer 31 of the optical waveguide 30. For example, in a case where a glass epoxy substrate having a relatively small coefficient of thermal expansion is used for the substrate 10 and an acrylic resin, an epoxy resin, or the like having a relatively large coefficient of thermal expansion is used for the cladding layer 31, a resin material that satisfies a relational expression $CTE_P<CTE_B<CTE_C$ is used for the buffer layer 20.

For the buffer layer 20, it is preferable to use a resin material that has a post-cure elastic modulus of 2000 MPa to 10000 MPa.

As described above, in the optical waveguide substrate 1 illustrated in FIG. 1, the buffer layer 20, which has a favorable adhesion with the bottom surface 11a and wall surface 11b of the recess 11 as well as with the cladding layer 31, is disposed between the substrate 10 and the optical waveguide 30 disposed inside the recess 11 of the substrate 10. Disposing such a buffer layer 20 makes it possible to suppress occurrence of peeling or cracking between the bottom surface 11a and wall surface 11b of the recess 11 and the cladding layer 31.

In the optical waveguide substrate 1 illustrated in FIG. 1, the buffer layer 20, which has a coefficient of thermal expansion $CTE_B$ between the coefficient of thermal expansion $CTE_P$ of the substrate 10 and the coefficient of thermal expansion $CTE_C$ of the cladding layer 31, is disposed between the substrate 10 and the optical waveguide 30 disposed inside the recess 11 of the substrate 10. Disposing such a buffer layer 20 makes it possible to enhance the durability against heat applied during or after the formation of the optical waveguide substrate 1.

For example, disposing the buffer layer 20 between the substrate 10 and the optical waveguide 30 makes it possible to enhance the durability against heat applied during the curing of the cladding layer 31 or during baking after the curing, and against heat generated when a component (an optical component or an electronic component) is mounted on the substrate 10 or the component operates in a case where the substrate 10 is a circuit substrate. This makes it possible to suppress occurrence of peeling or cracking between the bottom surface 11a and wall surface 11b of the recess 11 and the cladding layer 31. Disposing the buffer layer 20 between the wall surface 11b of the recess 11 and the cladding layer 31 makes it possible to suppress thermal expansion of the optical waveguide 30 in the thickness direction.

For example, in a case where the cladding layer 31 of the optical waveguide 30 is disposed in direct contact with the bottom surface 11a and wall surface 11b of the recess 11 of the substrate 10, it is possible that peeling or cracking occur in the interface between the cladding layer 31 and the bottom surface 11a and wall surface 11b, depending on the combination of materials of the cladding layer 31 and the bottom surface 11a and wall surface 11b. Depending on the combination of materials of the cladding layer 31 and the bottom surface 11a and wall surface 11b, it is possible that peeling or cracking occur in the interface between the cladding layer 31 and the bottom surface 11a and wall surface 11b due to the difference between the coefficient of thermal expansion $CTE_C$ and the coefficient of thermal expansion $CTE_P$. Such peeling or cracking in the interface has a risk of causing a decrease in mechanical strength of the optical waveguide substrate 1, displacement of the optical waveguide 30, an increase in the loss of optical signals transmitted, and the like, thus degrading the quality and reliability of the optical waveguide substrate 1.

In contrast, in the optical waveguide substrate 1 of the first embodiment, as illustrated in FIG. 1, the buffer layer 20 using a resin material which is selected in consideration of the adhesion and the difference in coefficient of thermal expansion between the cladding layer 31 and the bottom surface 11a and wall surface 11b is disposed between the cladding layer 31 and the bottom surface 11a and wall surface 11b. This makes it possible to relax the stress generated between the bottom surface 11a and wall surface 11b of the recess 11 and the cladding layer 31 and suppress occurrence of peeling or cracking between the bottom surface 11a and wall surface 11b of the recess 11 and the cladding layer 31, thus achieving an optical waveguide substrate 1 with high quality and reliability.

Instead of the buffer layer 20 as illustrated in FIG. 1, a buffer layer 20 as illustrated in FIG. 2 described below may be disposed between the bottom surface 11a and wall surface 11b of the recess 11 of the substrate 10 and the cladding layer 31 of the optical waveguide 30.

Figure 2B:
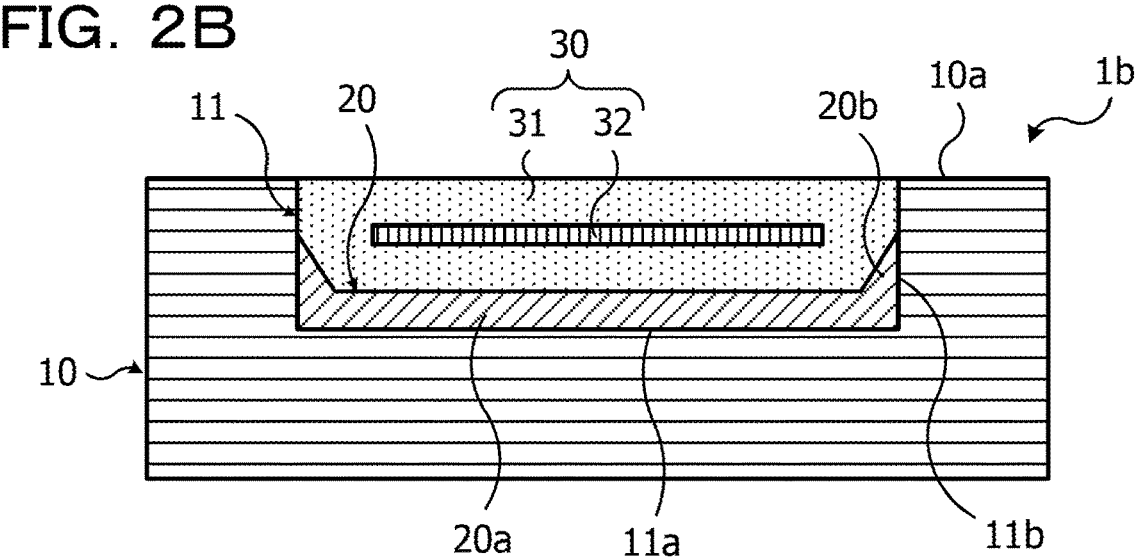
Figure 2C:
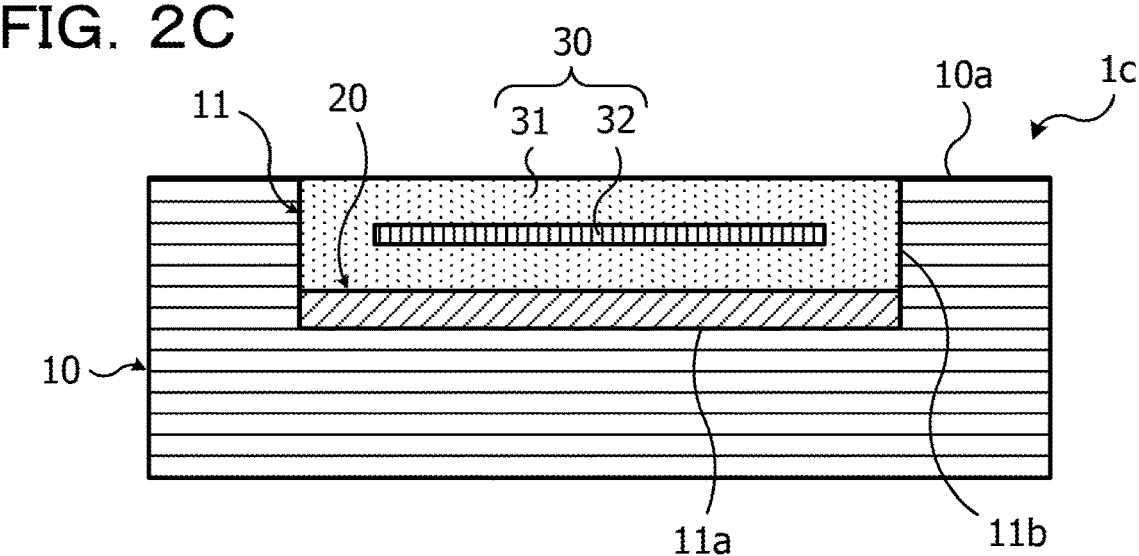

FIGS. 2A to 2C each illustrate a modification of the optical waveguide substrate according to the first embodiment. FIGS. 2A to 2C each schematically illustrate a main-part cross-sectional view of the modification of the optical waveguide substrate.

An optical waveguide substrate 1a illustrated in FIG. 2A has a configuration in which a buffer layer 20 having a uniform thickness is disposed on a bottom surface 11a and wall surface 11b of a recess 11 of a substrate 10. An optical waveguide 30 having a cladding layer 31 and a core layer 32 is disposed inside the recess 11 which includes such a buffer layer 20.

In the optical waveguide substrate 1a illustrated in FIG. 2A, since the buffer layer 20 is disposed between the optical waveguide 30 and the substrate 10, the optical waveguide 30 and the substrate 10 are not in direct contact with each other. For this reason, it is possible to suppress occurrence of peeling or cracking due to the adhesion and the difference in coefficient of thermal expansion between the optical waveguide 30 and the substrate 10. Since the buffer layer 20 is disposed relatively thickly with a uniform thickness between the cladding layer 31 of the optical waveguide 30 and the wall surface 11b of the recess 11 of the substrate 10, it is possible to effectively suppress thermal expansion of the optical waveguide 30 in the thickness direction.

An optical waveguide substrate 1b illustrated in FIG. 2B has a configuration in which a buffer layer 20 is disposed on a bottom surface 11a and part of a wall surface 11b of a recess 11 of a substrate 10. In the optical waveguide substrate 1b, a portion 20b of the buffer layer 20 is disposed to rise from a portion 20a of the buffer layer 20, which is disposed along the bottom surface 11a of the recess 11, up to a height that does not reach an upper surface 10a, along the wall surface 11b of the recess 11. An optical waveguide 30 having a cladding layer 31 and a core layer 32 is disposed inside the recess 11 which includes such a buffer layer 20.

In the optical waveguide substrate 1b illustrated in FIG. 2B, the wall surface 11b of the recess 11 is partially covered with the buffer layer 20. In the optical waveguide substrate 1b, since a portion where the optical waveguide 30 and the substrate 10 are not in direct contact with each other is formed (or a portion where the optical waveguide 30 and the substrate 10 are in direct contact with each other is small), it is possible to suppress occurrence of peeling or cracking due to the adhesion and the difference in coefficient of thermal expansion between the optical waveguide 30 and the substrate 10.

The optical waveguide substrate 1c illustrated in FIG. 2C includes a buffer layer 20 disposed along a bottom surface 11a of a recess 11 of a substrate 10 (which corresponds to the above-described portion 20a), and an optical waveguide 30 having a cladding layer 31 and a core layer 32 is disposed inside the recess 11 which includes such a buffer layer 20. In the optical waveguide substrate 1c, the buffer layer 20 disposed with a uniform thickness on the bottom surface 11a of the recess 11 may be said to be an example disposed on the bottom surface 11a and wall surface 11b (or part thereof) of the recess 11 of the substrate 10.

With the configuration of the optical waveguide substrate 1c illustrated in FIG. 2C as well, since a portion where the optical waveguide 30 and the substrate 10 are not in direct contact with each other is formed, it is possible to suppress occurrence of peeling or cracking due to the adhesion and the difference in coefficient of thermal expansion between the optical waveguide 30 and the substrate 10.

Second Embodiment

FIG. 3 illustrates an example of an optical waveguide substrate according to a second embodiment. FIG. 3 schematically illustrates a main-part cross-sectional view of the example of the optical waveguide substrate.

An optical waveguide substrate 100 illustrated in FIG. 3 is an example of a photoelectric composite substrate including: a circuit substrate 110 such as a printed substrate; and an optical waveguide 130 disposed on the circuit substrate 110. In the optical waveguide substrate 100, the optical waveguide 130 is disposed inside a recess 111 of the circuit substrate 110 and a buffer layer 120 is disposed between a bottom surface 111a and wall surface 111b of the recess 111 and the optical waveguide 130. The recess 111 of the circuit substrate 110 is also referred to as a counterbore or the like. The planar shape of the recess 111 is not particularly limited, and various planar shapes may be employed such as a rectangular or substantially rectangular shape, a polygonal or substantially polygonal shape, a circular or substantially circular shape, and an elliptic or substantially elliptic shape in a plan view.

The circuit substrate 110 of the optical waveguide substrate 100 illustrated in FIG. 3 is an example corresponding to the substrate 10 described in the above first embodiment. The optical waveguide 130 of the optical waveguide substrate 100 illustrated in FIG. 3 is an example corresponding to the optical waveguide 30 described in the above first embodiment. The buffer layer 120 of the optical waveguide substrate 100 illustrated in FIG. 3 is an example corresponding to the buffer layer 20 described in the above first embodiment.

The circuit substrate 110 includes: an insulative base material 112; and a conductor pattern 113 such as wiring disposed on a surface and inside of the insulative base material 112. For the insulative base material 112, used is, for example, an epoxy resin containing glass fibers (glass epoxy). For the conductor pattern 113, used is any of various conductive materials, for example, a metal material such as copper (Cu), nickel (Ni), or aluminum (Al). On part of the insulative base material 112, a recess 111 is disposed. In a predetermined region on the surface of the insulative base material 112, a protection film 114 such as a solder resist is disposed.

The optical waveguide 130 disposed inside the recess 111 of the circuit substrate 110 has a cladding layer 131 and a core layer 132 disposed inside the cladding layer 131. Although FIG. 3 illustrates a single core layer 132 inside the cladding layer 131, a plurality of core layers 132 may be disposed inside the cladding layer 131. The shape of the core layer 132 is not limited to a straight shape but may be a curved shape or a shape having a curved portion.

As the optical waveguide 130, used is an optical waveguide having a refractive index distribution of GI-type, for example. For the core layer 132, used is a material containing one or two or more of resin materials such as silicone resins, acrylic resins, epoxy resins, and polyimide resins, for example. The core layer 132 has such a refractive index distribution that the refractive index decreases from the central portion toward the peripheral portion. For the cladding layer 131, used is a material containing one or two or more of resin materials such as silicone resins, acrylic resins, epoxy resins, and polyimide resins, for example. For the cladding layer 131, a resin material that makes the refractive index of the cladding layer 131 lower than that of the central portion of the core layer 132 is used. For the core layer 132 and the cladding layer 131, photosensitive resin materials that are cured by irradiation of light such as an ultra violet (UV) ray is used.

The buffer layer 120, which is disposed between the bottom surface 111a and wall surface 111b of the recess 111 and the cladding layer 131, has: a portion 120a disposed along the bottom surface 111a; and a portion 120b disposed to rise up from the portion 120a along the wall surface 111b. FIG. 3 illustrates, as an example, a mode in which the film thickness of the portion 120b of the buffer layer 120 (the thickness of the circuit substrate 110 in a plane direction) becomes thinner toward one surface (upper surface) 110a of the circuit substrate 110 in a cross-sectional view.

For the buffer layer 120, used is a material containing one or two or more of resin materials such as epoxy resins, phenolic resins, silicone resins, polyimide resins, and polyamide resins, for example. The resin material used for the buffer layer 120 may be of solvent type or non-solvent type, and may be of one-liquid type or two-liquid type. For the buffer layer 120, a photocurable, thermosetting, or thermoplastic resin material is used.

For the buffer layer 120, used is a resin material that makes the adhesion between the optical waveguide 130 and the circuit substrate 110 higher than that in the case where the cladding layer 131 of the optical waveguide 130 is disposed in direct contact with the bottom surface 111a and wall surface 111b of the recess 111 of the circuit substrate 110. For the buffer layer 120, used is a resin material that makes the buffer layer 120 have a coefficient of thermal expansion $CTE_B$ between the coefficient of thermal expansion $CTE_P$ of the insulative base material 112 of the circuit substrate 110 and the coefficient of thermal expansion $CTE_C$ of the cladding layer 131 of the optical waveguide 130 ($CTE_P<CTE_B<CTE_C$). For the buffer layer 120, a resin material that has a post-cure elastic modulus of 2000 MPa to 10000 MPa is used, for example.

As described above, in the optical waveguide substrate 100 illustrated in FIG. 3, the buffer layer 120, which has a favorable adhesion with the bottom surface 111a and wall surface 111b of the recess 111 as well as with the cladding layer 131, is disposed between the circuit substrate 110 and the optical waveguide 130 disposed inside the recess 111 of the circuit substrate 110. In the optical waveguide substrate 100, the buffer layer 120, which has a coefficient of thermal expansion $CTE_B$ between the coefficient of thermal expansion $CTE_P$ of the insulative base material 112 and the coefficient of thermal expansion $CTE_C$ of the cladding layer 131, is disposed between the circuit substrate 110 and the optical waveguide 130 disposed inside the recess 111 of the circuit substrate 110.

Disposing such a buffer layer 120 makes it possible to enhance the durability against heat applied during or after the formation of the optical waveguide substrate 100, for example, heat applied during the baking after the curing of the cladding layer 131 and heat generated when a component is mounted on the circuit substrate 110 or the component operates. This makes it possible to suppress occurrence of peeling or cracking between the bottom surface 111a and wall surface 111b of the recess 111 and the cladding layer 131. Disposing the buffer layer 120 between the wall surface 111b of the recess 111 and the cladding layer 131 makes it possible to suppress thermal expansion of the optical waveguide 130 in the thickness direction.

Subsequently, an example of a method of forming an optical waveguide substrate 100 having the above-described configuration will be described.

Figure 5:
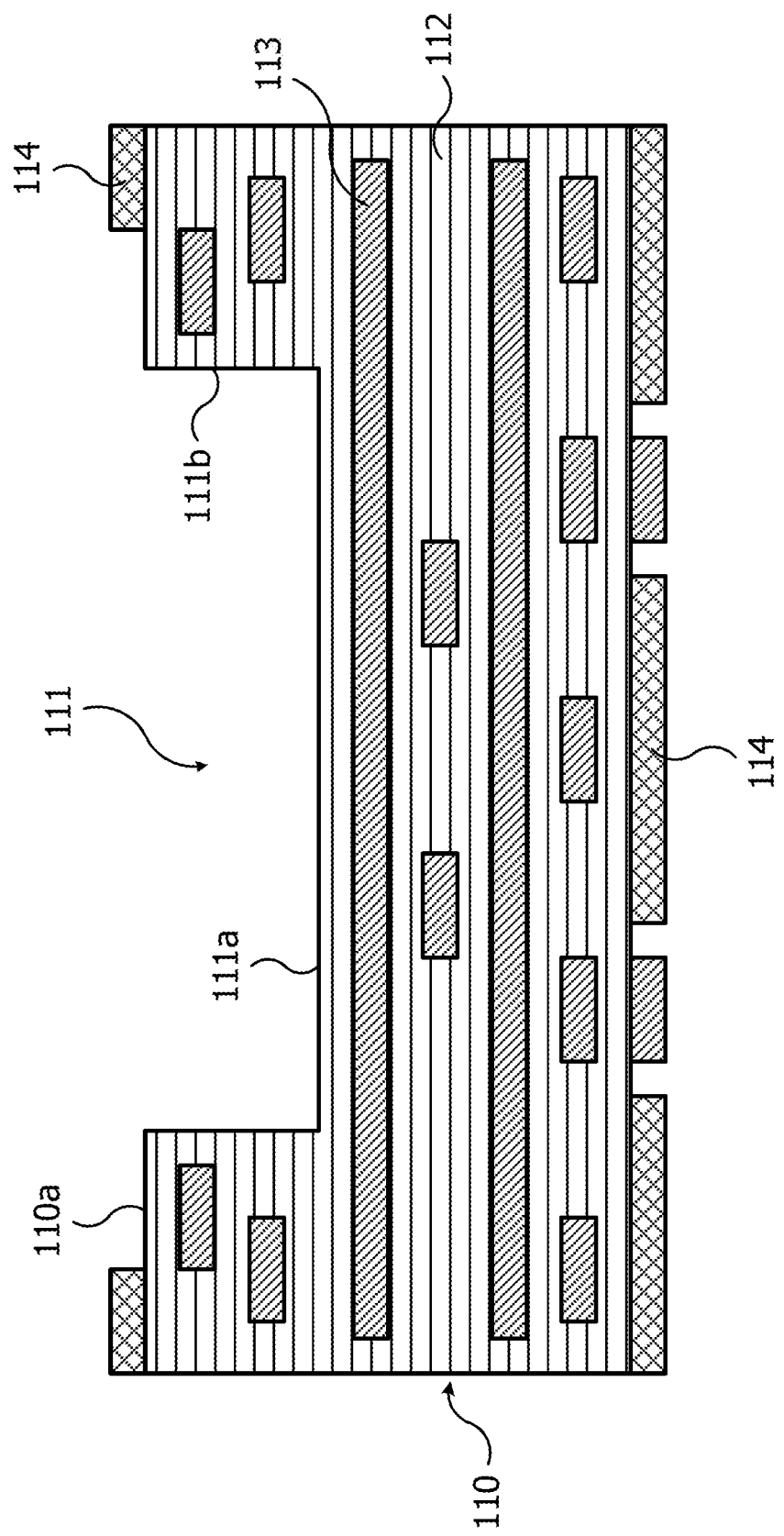
FIG. 5 illustrates the example of the method of forming the optical waveguide substrate according to the second embodiment (Part 2)
Figure 6:
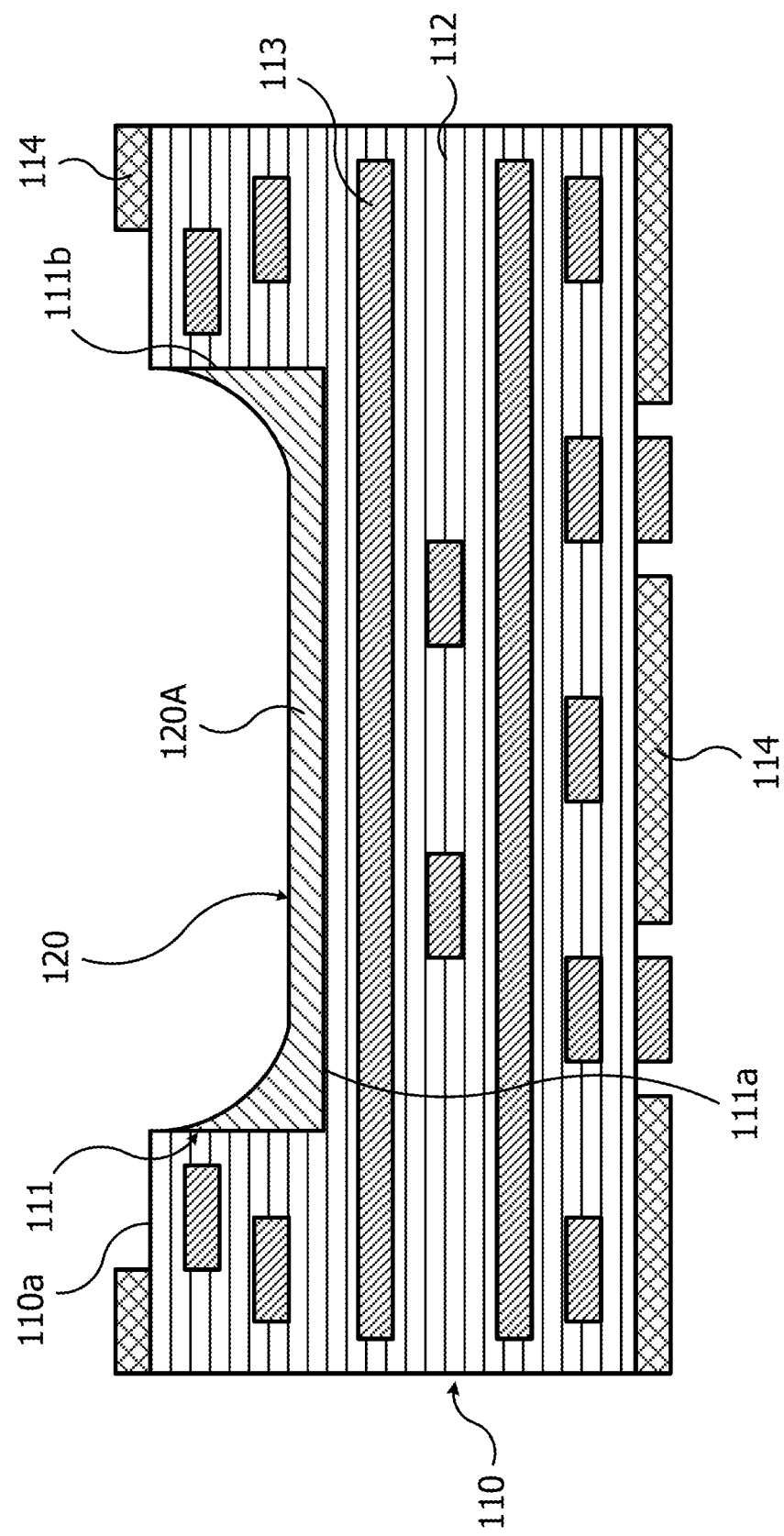
FIG. 6 illustrates the example of the method of forming the optical waveguide substrate according to the second embodiment (Part 3)
Figure 7:
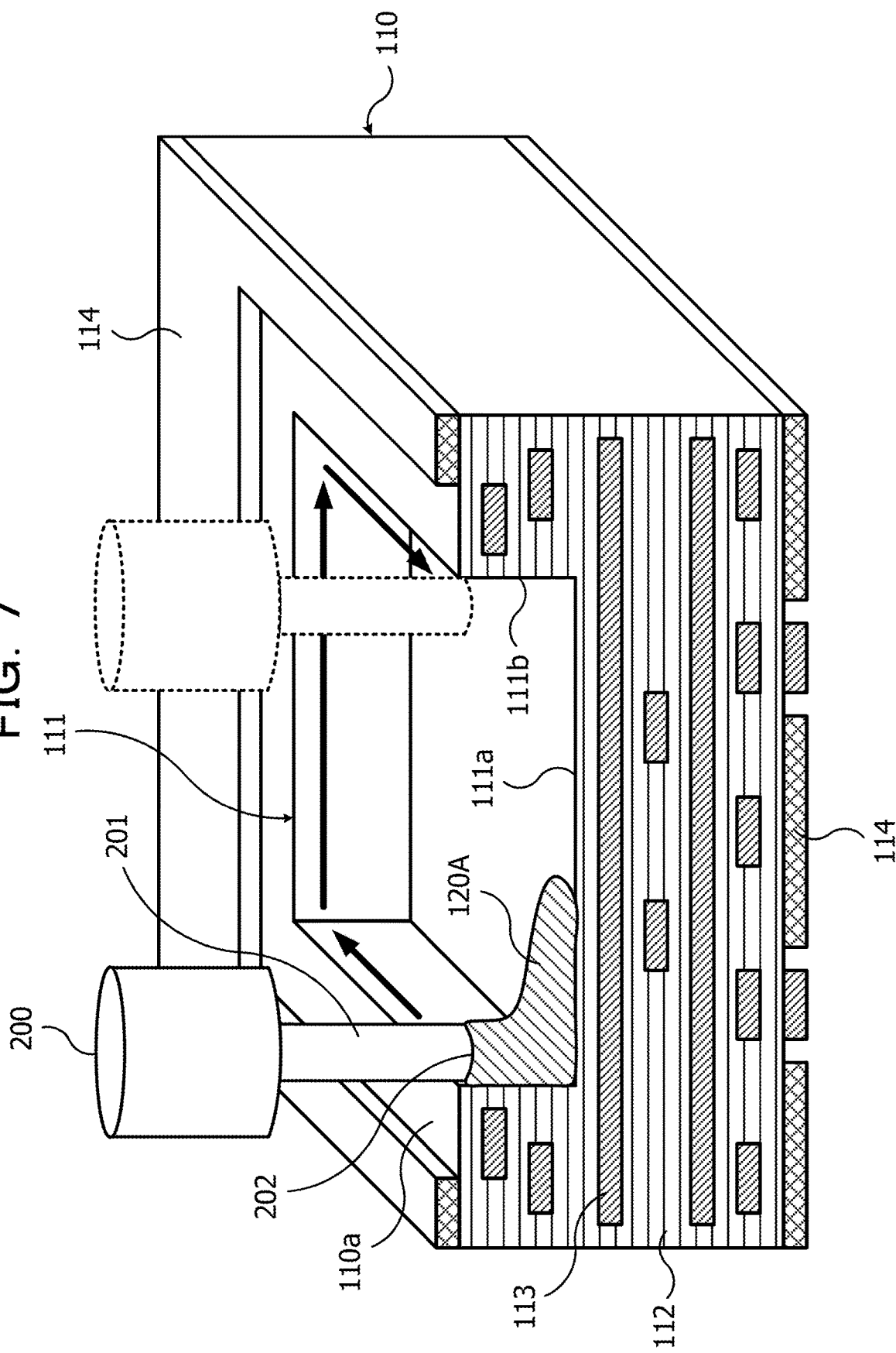
FIG. 7 illustrates the example of the method of forming the optical waveguide substrate according to the second embodiment (Part 4)

FIGS. 4 to 10 illustrate an example of the method of forming an optical waveguide substrate according to a second embodiment. FIGS. 4 to 6 and FIGS. 8 to 10 each schematically illustrate a main-part cross-sectional view of each step of the formation of an optical waveguide substrate, and FIG. 7 schematically illustrates a main-part perspective view for explaining the step of FIG. 6. Hereinafter, each step of the formation of an optical waveguide substrate will be described in order with reference to FIGS. 4 to 10.

FIG. 4 illustrates an example of a circuit substrate preparation step.

First, a circuit substrate 110A as illustrated in FIG. 4 is prepared. The circuit substrate 110A is formed for example by stacking sheet-shaped glass epoxy materials with a conductor pattern 113 formed thereon, and forming a through-hole to electrically connect the conductor patterns 113 of the layers. Alternatively, the circuit substrate 110A is formed by a build-up method in which the staking of a sheet-shaped glass epoxy material and the formation of a conductor pattern 113 (including electrically connecting the conductor patterns 113 of the layers) are repeated. With such an approach, the circuit substrate 110A, as illustrated in FIG. 4, including: an insulative base material 112 formed by stacking glass epoxy materials; the conductor patterns 113 formed on the surface and inside of the insulative base material 112; and protection films 114 formed on the surface of the insulative base material 112 is formed.

By forming a circuit substrate 110A or by obtaining a formed circuit substrate 110A, the circuit substrate 110A is prepared.

FIG. 5 illustrates an example of a recess formation step.

After the circuit substrate 110A is prepared, a recess 111 is formed in part of the insulative base material 112 of the circuit substrate 110A, as illustrated in FIG. 5. The planar shape of the recess 111 is for example a rectangular or substantially rectangular shape. The planar size and depth of the recess 111 is set based on the planar size and depth of the optical waveguide 130 to be formed inside the recess 111, the thickness of the buffer layer 120, and the like, as described later. The recess 111 is formed by laser machining, routing, drilling, or the like. By such an approach, the circuit substrate 110, as illustrated in FIG. 5, having the recess 111, where the insulative base material 112 is exposed, in the bottom surface 111a and wall surface 111b is formed.

FIGS. 6 and 7 illustrate an example of a buffer layer formation step.

After the circuit substrate 110 having the recess 111 is formed, a resin material (buffer material) 120A, which becomes a buffer layer 120, is formed inside the recess 111, as illustrated in FIG. 6. As the buffer material 120A, used is a material that has a favorable adhesion with the insulative base material 112 and the cladding layer 131 and has a coefficient of thermal expansion $CTE_B$ between the coefficients of thermal expansion $CTE_P$ and $CTE_C$ of the insulative base material 112 and the cladding layer 131. Such a buffer material 120A is supplied into the recess 111 from a nozzle 201 of a dispenser device 200, as illustrated in FIG. 7, for example.

When the buffer material 120A is supplied, the nozzle 201 is moved along the wall surface 111b of the recess 111 as indicated by the arrow in FIG. 7 with a supply port 202 of the nozzle 201 being located on or near the wall surface 111b of the recess 111, as illustrated in FIG. 7 (the nozzle 201 moved is illustrated with a dotted line in FIG. 7). From the supply port 202 of the nozzle 201 thus moved, the buffer material 120A is supplied into the recess 111.

The buffer material 120A thus supplied flows onto the bottom surface 111a along the wall surface 111b owing to gravity while part of the buffer material 120A remains on the wall surface 111b to gradually cover the wall surface 111b and the bottom surface 111a. Alternatively, the buffer material 120A thus supplied flows onto the bottom surface 111a along the wall surface 111b owing to gravity, and also rises up along the wall surface 111b owing to surface tension to gradually cover the wall surface 111b and the bottom surface 111a. When the nozzle 201 is moved along the wall surface 111b of the recess 111 with the supply port 202 being located on or near the wall surface 111b of the recess 111 and near the upper surface 110a of the circuit substrate 110, a relatively large amount of the buffer material 120A is easily supplied onto the wall surface 111b.

The buffer material 120A, which has been supplied inside the recess 111 by such an approach, is then cured by an approach suitable for the type of the buffer material 120A, that is, light irradiation, heating, cooling, or the like. With this, the buffer layer 120 as illustrated in FIG. 6, disposed on the bottom surface 111a and the wall surface 111b of the recess 111, is formed. By adjusting the method of supplying the buffer material 120A from the nozzle 201 (route for moving the nozzle 201, the height of the supply port 202), the buffer layer 120 is formed on the bottom surface 111a and the wall surface 111b of the recess 111.

Figure 8:
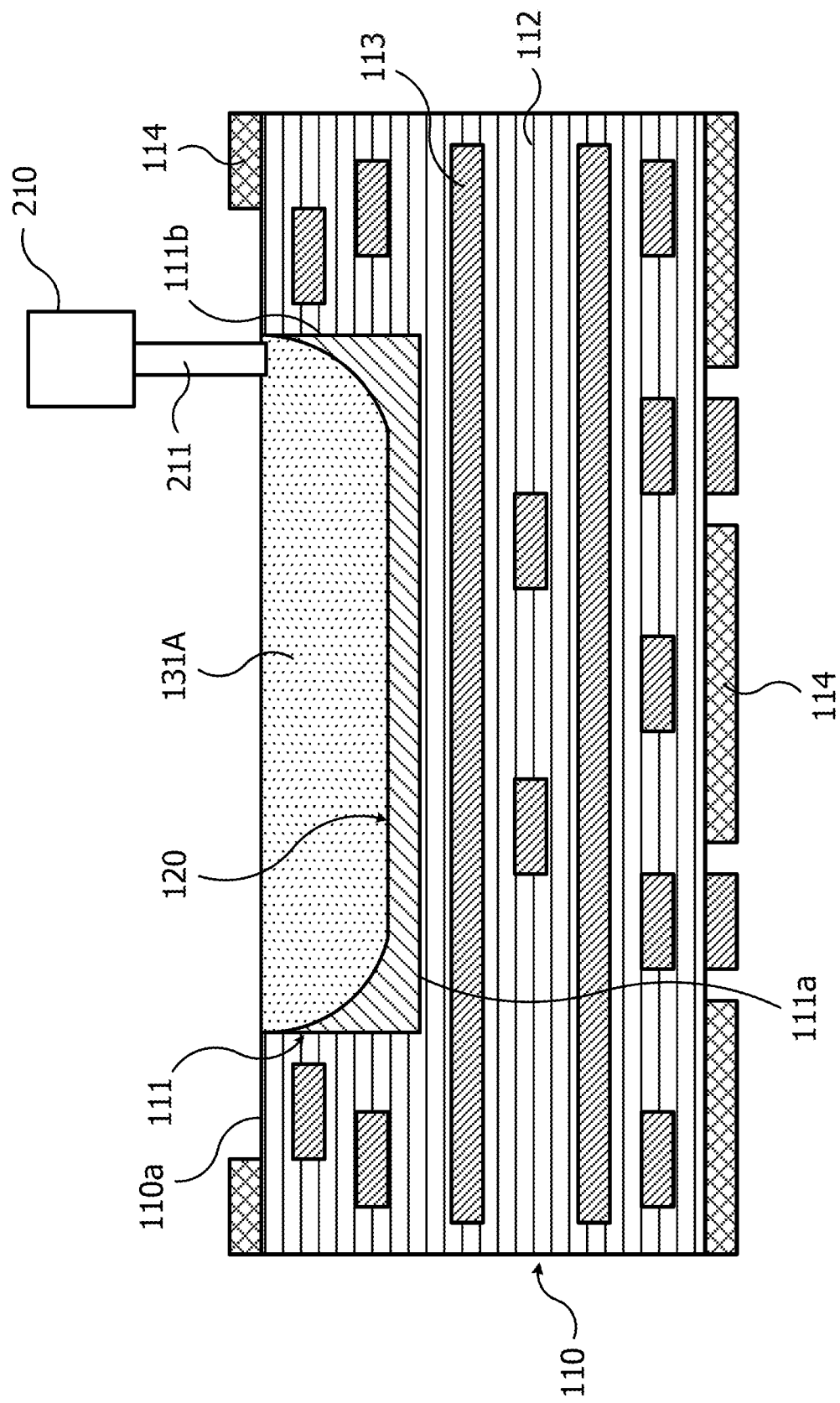
FIG. 8 illustrates the example of the method of forming the optical waveguide substrate according to the second embodiment (Part 5)

FIG. 8 illustrates an example of a cladding layer formation step.

After the buffer layer 120 is formed on the bottom surface 111a and the wall surface 111b of the recess 111, a resin material (cladding material) 131A, which becomes the cladding layer 131, is formed inside the recess 111 in which the buffer layer 120 has been formed, as illustrated in FIG. 8. For the cladding material 131A, used is a photocurable photosensitive resin material which is cured by irradiation of light such as UV, for example. Such a cladding material 131A is supplied from the nozzle 211 of the dispenser device 210 into the recess 111 in which the buffer layer 120 has been formed, as illustrated in FIG. 8, for example. The cladding material 131A is not cured yet at this stage.

Figure 9:
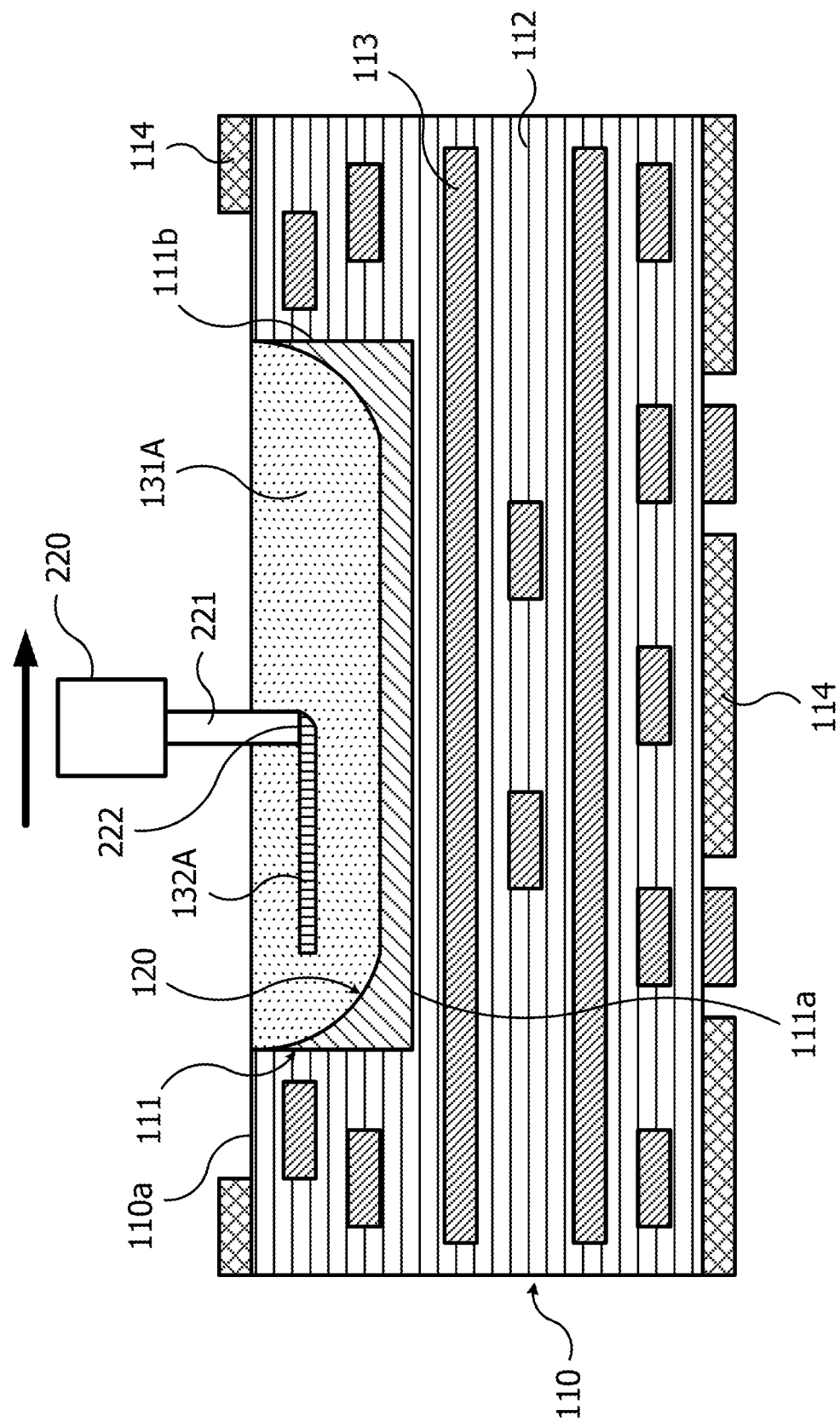
FIG. 9 illustrates the example of the method of forming the optical waveguide substrate according to the second embodiment (Part 6)

FIG. 9 illustrates an example of a core layer formation step.

After the cladding material 131A is formed, a resin material (core material) 132A, which becomes the core layer 132, is formed inside the cladding material 131A, as illustrated in FIG. 9. For the core material 132A, used is a photocurable photosensitive resin material which is cured by irradiation of light such as UV, for example. The core material 132A is supplied using the nozzle 221 of the dispenser device 220, as illustrated in FIG. 9, for example.

When the core material 132A is supplied, a supply port 222 at a tip portion of the nozzle 221 is inserted (stuck) into a predetermined position inside the cladding material 131A, as illustrated in FIG. 9. Then, as illustrated in FIG. 9, the nozzle 221 is moved in a predetermined direction (which is not limited to one direction) as indicated by the arrow in FIG. 9 while the core material 132A is supplied from the supply port 222 of the nozzle 221 which has been inserted into the cladding material 131A. With such an approach, the core material 132A having a predetermined pattern shape is formed at the predetermined position inside the cladding material 131A. After the core material 132A is formed, the nozzle 221 is removed from the cladding material 131A.

Figure 10:
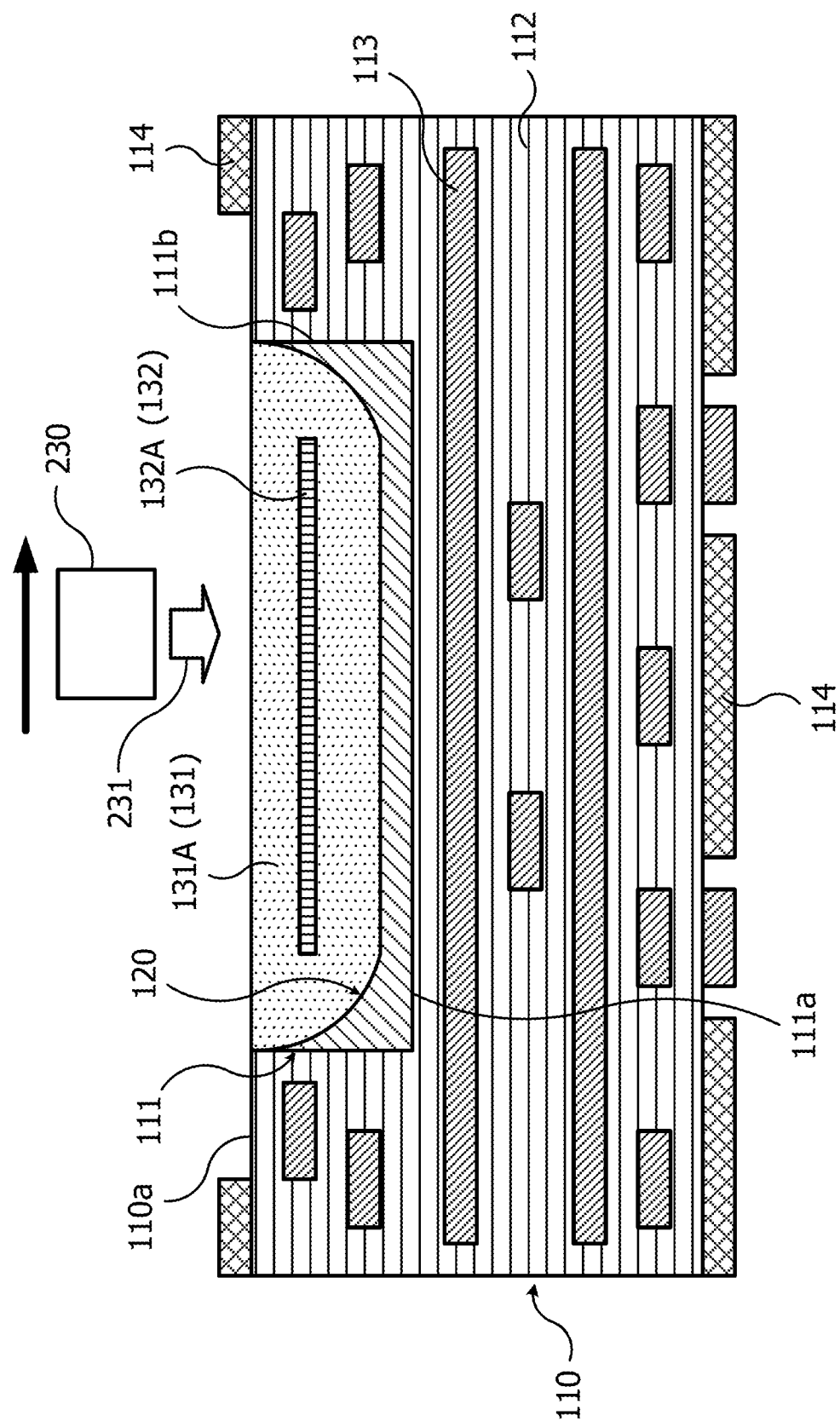
FIG. 10 illustrates the example of the method of forming the optical waveguide substrate according to the second embodiment (Part 7)

FIG. 10 illustrates an example of a resin material curing step.

After the cladding material 131A and the core material 132A are formed, light 231 such as UV is applied by using a light irradiation device 230 to cure the cladding material 131A and the core material 132A, as illustrated in FIG. 10. For example, as indicated by the arrow in FIG. 10, the light irradiation device 230, while applying the light 231, is moved in a predetermined direction to cure the cladding material 131A and the core material 132A. The cladding material 131A and the core material 132A may be cured by using a stationary light irradiation device that is capable of setting an irradiation region of a size covering the entire formation region of the cladding material 131A and the core material 132A to apply light from the light irradiation device.

The cladding material 131A and the core material 132A formed by using the approaches as illustrated in FIGS. 8 and 9 are cured by using the approach as illustrated in FIG. 10, so that an optical waveguide 130 having the cladding layer 131 and the core layer 132 inside the cladding layer 131 is formed.

The optical waveguide 130 is disposed inside the recess 111 of the circuit substrate 110 by the method as illustrated in FIGS. 4 to 10, and an optical waveguide substrate 100 as illustrated in FIG. 3 in which the buffer layer 120 is disposed between the bottom surface 111a and wall surface 111b of the recess 111 and the optical waveguide 130 is formed.

Third Embodiment

An example of an optical device (optical instrument) using the optical waveguide substrate 100 as described above will be described as a third embodiment.

Figure 11:
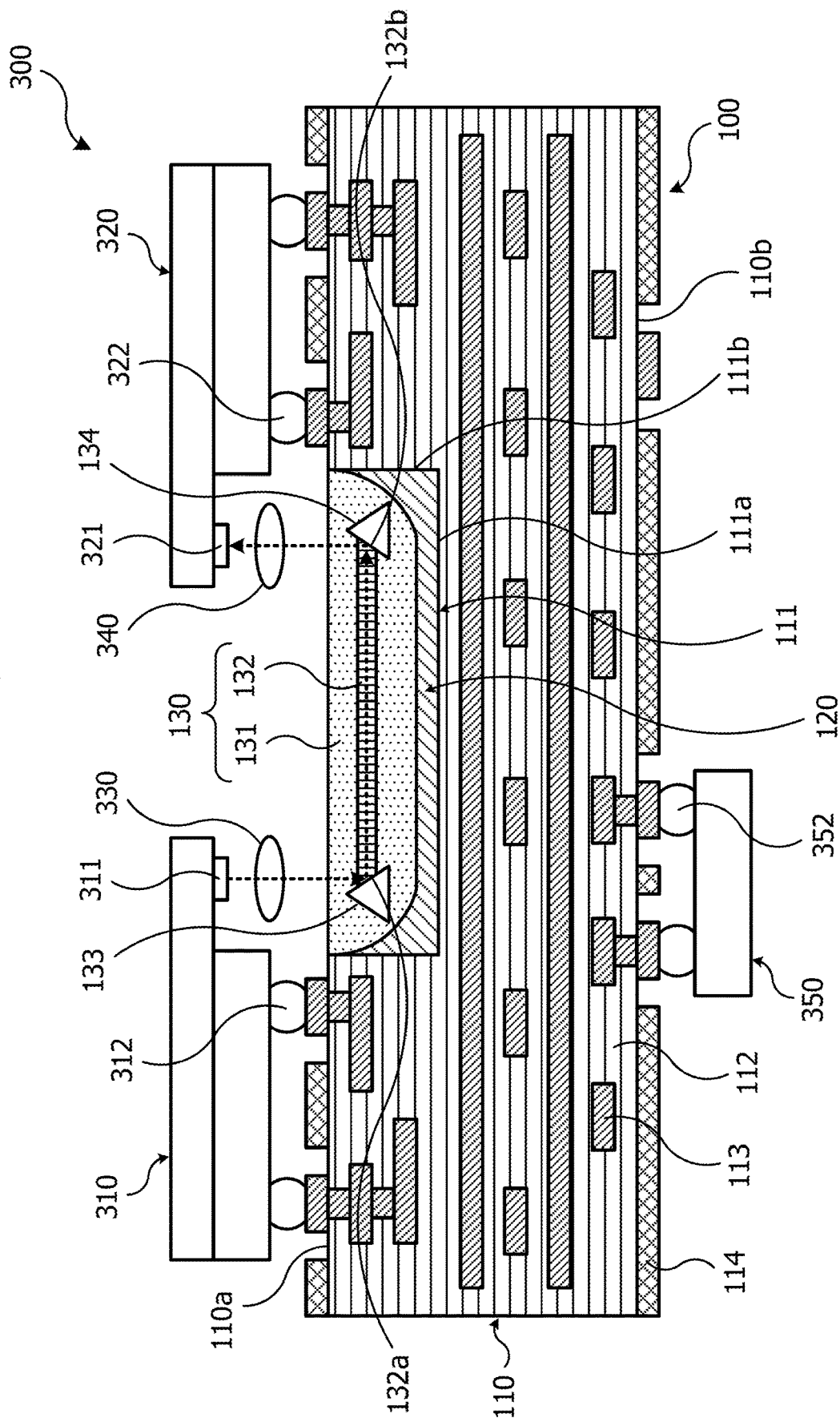
FIG. 11 illustrates an example of an optical device according to a third embodiment.

FIG. 11 illustrates an example of the optical device according to the third embodiment. FIG. 11 schematically illustrates a main-part cross-sectional view of the example of the optical device.

An optical device 300 illustrated in FIG. 11 includes: an optical waveguide substrate 100 having a circuit substrate 110 including an optical waveguide 130; a light-emitting element 310 and a light-receiving element 320 (optical components) mounted on the optical waveguide substrate 100.

The optical waveguide substrate 100 includes: the circuit substrate 110; the optical waveguide 130 disposed inside a recess 111 of the circuit substrate 110; and a buffer layer 120 disposed between a bottom surface 111a and wall surface 111b of the recess 111 and a cladding layer 131 of the optical waveguide 130. The optical waveguide 130 includes: a mirror 133 and a mirror 134 disposed on opposite ends of the core layer 132. As the mirror 133 and the mirror 134, a metal layer or an air layer may be used. The core layer 132 has, at opposite ends thereof, an end face 132a and an end face 132b, which are each inclined at a predetermined angle (for example, 45°) relative to a transmission direction of light. On the end face 132a and the end face 132b, the mirror 133 and the mirror 134 are disposed, respectively.

The light-emitting element 310 is mounted on one end face 132a side of the core layer 132 at the side of the surface of the circuit substrate 110 where the optical waveguide 130 is disposed. The light-emitting element 310 has a light-emitting part 311. The light-emitting element 310 is mounted such that the light-emitting part 311 is directed toward the optical waveguide 130, and is electrically and mechanically connected to a conductor pattern 113 disposed on an upper surface 110a of the circuit substrate 110 by using a bump 312 of solder or the like. The light-emitting element 310 converts an electrical signal sent from the circuit substrate 110 into an optical signal and emits the optical signal thus obtained from the light-emitting part 311 (illustrated by the dotted arrow in FIG. 11).

The light-receiving element 320 is mounted on the other end face 132b side of the core layer 132 at the side of the surface of the circuit substrate 110 where the optical waveguide 130 is disposed. The light-receiving element 320 has a light-receiving part 321. The light-receiving element 320 is mounted such that the light-receiving part 321 is directed toward the optical waveguide 130, and is electrically and mechanically connected to the conductor pattern 113 disposed on the upper surface 110a of the circuit substrate 110 by using a bump 322 of solder or the like. The light-receiving element 320 receives an optical signal at the light-receiving part 321 (illustrated by the dotted arrow in FIG. 11), converts the optical signal received into an electrical signal, and sends the electrical signal thus obtained to the circuit substrate 110.

In the optical device 300, the optical signal emitted from the light-emitting part 311 of the light-emitting element 310 is incident on the end face 132a or the mirror 133 on one side of the core layer 132 through a lens 330 disposed between the light-emitting part 311 and the optical waveguide 130 to be subjected to optical path conversion, and is transmitted through the core layer 132. The optical signal transmitted through the core layer 132 is incident on the end face 132b or the mirror 134 on the other side to be subjected to optical path conversion, and is received by the light-receiving part 321 through a lens 340 disposed between the optical waveguide 130 and the light-receiving part 321 of the light-receiving element 320. In this way, in the optical device 300, an optical signal is transmitted from the light-emitting element 310 to the light-receiving element 320, which are mounted on the optical waveguide substrate 100, through the optical waveguide 130 disposed in the optical waveguide substrate 100.

The optical device 300 may further include a semiconductor element 350 (electronic component) mounted on a surface of the optical waveguide substrate 100 (a lower face 110b of the circuit substrate 110) on the opposite side from the surface on which the light-emitting element 310 and the light-receiving element 320 are mounted, as illustrated in FIG. 11. The semiconductor element 350 is electrically and mechanically connected to the conductor pattern 113 disposed on the lower face 110b of the circuit substrate 110 by using a bump 352 of solder or the like.

On the optical waveguide substrate 100 of the optical device 300, various components such as another semiconductor element, resistive element, capacitive element, lens, optical connector, and mirror may be mounted besides the light-emitting element 310 and the light-receiving element 320 as well as the semiconductor element 350 as illustrated in FIG. 11.

In the optical device 300, the optical waveguide substrate 100 includes the buffer layer 120 between the optical waveguide 130, which is disposed inside the recess 111 of the circuit substrate 110, and the bottom surface 111a and wall surface 111b of the recess 111. For the buffer layer 120, used is a resin material having a favorable adhesion with the bottom surface 111a and wall surface 111b as well as with the cladding layer 131 and that makes the buffer layer 120 have a coefficient of thermal expansion $CTE_B$ between the coefficient of thermal expansion $CTE_P$ of the insulative base material 112 and the coefficient of thermal expansion $CTE_C$ of the cladding layer 131.

Disposing such a buffer layer 120 makes it possible to enhance the durability against heat applied during or after the formation of the optical waveguide substrate 100 and the optical device 300 using the optical waveguide substrate 100, for example, heat applied during the baking and heat generated when a component (an optical component or an electronic component) is mounted or operates. This makes it possible to suppress occurrence of peeling or cracking between the bottom surface 111a and wall surface 111b of the recess 111 and the cladding layer 131. As a result, it is possible to suppress a decrease in mechanical strength, displacement of the optical waveguide 130 (or the core layer 132 thereof) relative to the light-emitting element 310 (or the light-emitting part 311 thereof) and the light-receiving element 320 (or the light-receiving part 321 thereof), an increase in transmission loss of optical signals, and the like, and to achieve an optical device 300 having high quality and reliability.

Disposing the buffer layer 120 between the wall surface 111b of the recess 111 and the cladding layer 131 makes it possible to suppress thermal expansion of the optical waveguide 130 in the thickness direction. This makes it possible to suppress change in distance between the core layer 132 (or the end face 132a or mirror 133 thereof) and the light-emitting part 311 and lens 330 as well as change in distance between the core layer 132 (or the end face 132b or mirror 134 thereof) and the light-receiving part 321 and lens 340. As a result, it is possible to suppress an increase in transmission loss of optical signals between the core layer 132 and the light-emitting part 311 and an increase in transmission loss of optical signals between the core layer 132 and the light-receiving part 321, and to achieve an optical device 300 having an excellent transmission characteristic.

Figure 12:
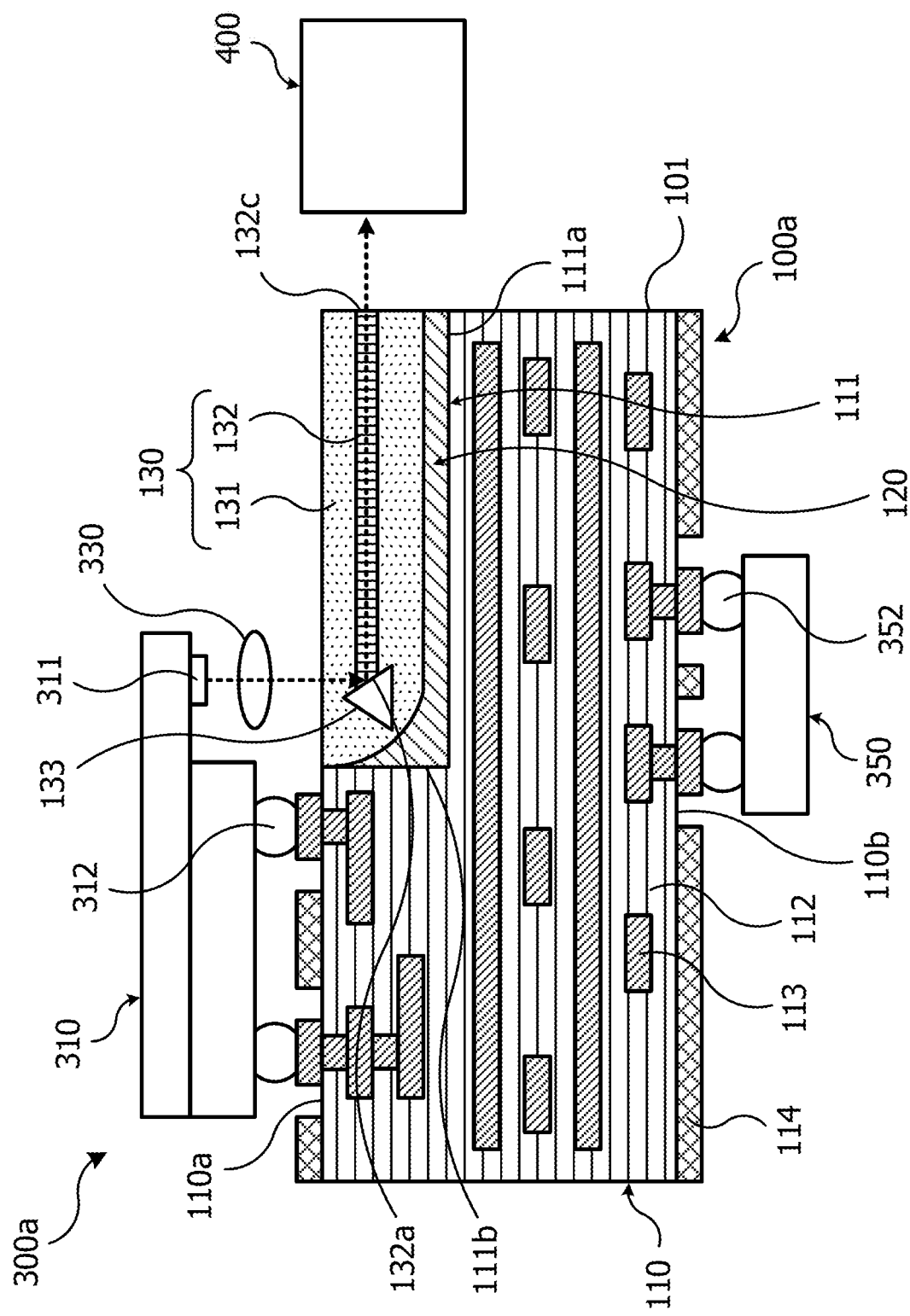
FIG. 12 illustrates a modification of the optical device according to the third embodiment.

FIG. 12 illustrates a modification of the optical device according to the third embodiment. FIG. 12 schematically illustrates a main-part cross-sectional view of the modification of the optical device.

An optical device 300a illustrated in FIG. 12 includes an optical waveguide substrate 100a that is obtained by cutting part of the above-described optical waveguide substrate 100. From a cut face 101 of the optical waveguide substrate 100a, a cladding layer 131 and a core layer 132 of an optical waveguide 130 as well as a buffer layer 120 are exposed.

On the optical waveguide substrate 100a, a light-emitting element 310 is mounted while being electrically and mechanically connected to a conductor pattern 113 by using a bump 312. An optical signal emitted from a light-emitting part 311 of the light-emitting element 310 is incident on an end face 132a or a mirror 133 on one side of the core layer 132 through a lens 330 to be subjected to optical path conversion, and is transmitted through the core layer 132. The optical signal is transmitted through the core layer 132 and emitted from an end face 132c on the other side.

The optical signal emitted from the end face 132c of the core layer 132 of the optical waveguide substrate 100a is incident on an optical component 400, for example, a lens, an optical fiber, an optical connector, a mirror, a light-receiving element, or the like which is optically connected to the core layer 132 and disposed outside the optical waveguide substrate 100a.

With such an optical waveguide substrate 100a as well, disposing the buffer layer 120 using a predetermined resin material makes it possible to enhance the durability against heat applied during or after the formation of the optical waveguide substrate 100a and the optical device 300a using the optical waveguide substrate 100a. This makes it possible to achieve an optical device 300a having high quality and reliability.

Since the buffer layer 120 suppresses thermal expansion of the optical waveguide 130 in the thickness direction, it is possible to suppress change in distance between the core layer 132 (or the end face 132a or mirror 133 thereof) and the light-emitting part 311 and lens 330. This makes it possible to achieve an optical device 300a having an excellent transmission characteristic.

Fourth Embodiment

Various configuration examples of the above-described optical waveguide substrate 100 will be described as a fourth embodiment.

Figure 13:
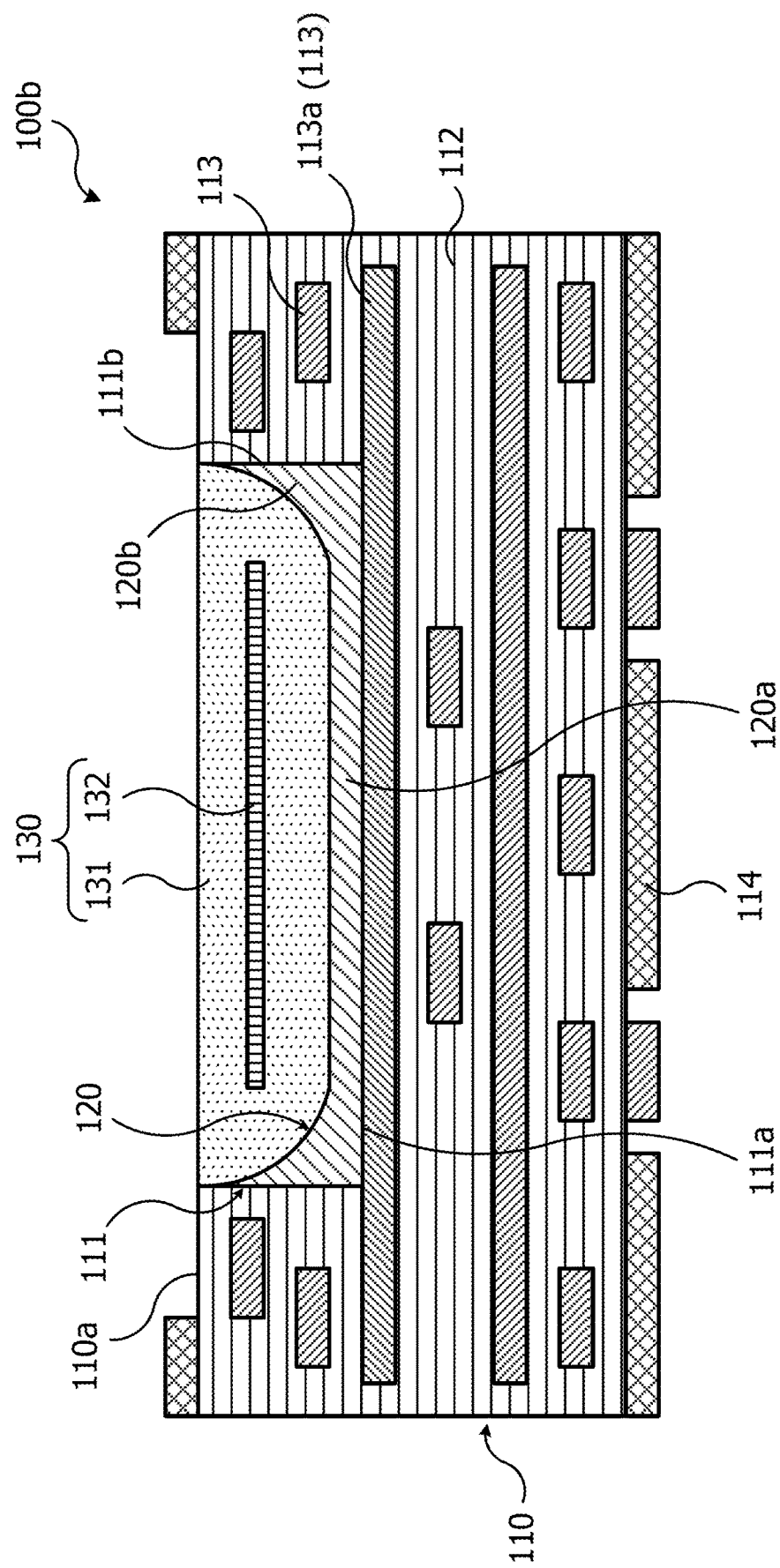
FIG. 13 illustrates a first configuration example of an optical waveguide substrate according to a fourth embodiment.

FIG. 13 illustrates a first configuration example of the optical waveguide substrate according to the fourth embodiment. FIG. 13 schematically illustrates a main-part cross-sectional view of the first configuration example of the optical waveguide substrate.

An optical waveguide substrate 100b illustrated in FIG. 13 is different from the optical waveguide substrate 100 described in the above second embodiment in that a bottom surface 111a of a recess 111 of a circuit substrate 110 is a conductor pattern 113 (conductor pattern 113a).

The conductor pattern 113a of the bottom surface 111a of the recess 111 is a plane layer having a power source (VDD) potential or a ground (GND) potential, for example. For the conductor pattern 113a, used is a metal material such as Cu, Ni, or Al. For the buffer layer 120 disposed between the bottom surface 111a and wall surface 111b of the recess 111 and the cladding layer 131 of the optical waveguide 130, used is a resin material having a favorable adhesion with the conductor pattern 113a and the insulative base material 112 as well as with the cladding layer 131. For the buffer layer 120, used is a resin material that makes the buffer layer 120 have a coefficient of thermal expansion $CTE_B$ between the coefficients of thermal expansion $CTE_Q$ and $CTE_P$ of the conductor pattern 113a and the insulative base material 112 and the coefficient of thermal expansion $CTE_C$ of the cladding layer 131 ($CTE_Q$, $CTE_P$<$CTE_B$<$CTE_C$).

Disposing such a buffer layer 120 make it possible to enhance the durability against heat applied during or after the formation of the optical waveguide substrate 100b. This makes it possible to suppress occurrence of peeling or cracking between the bottom surface 111a and wall surface 111b of the recess 111 and the cladding layer 131. Disposing the buffer layer 120 between the wall surface 111b of the recess 111 and the cladding layer 131 makes it possible to suppress thermal expansion of the optical waveguide 130 in the thickness direction.

In the optical waveguide substrate 100b illustrated in FIG. 13, the conductor pattern 113a may be utilized as a stopper layer for laser machining or the like in the step of forming the recess 111 as illustrated in FIG. 5. This makes it possible to form the recess 111 having a predetermined depth with high precision, and to thus stably supply the material in a uniform amount into the recess 111 in the step of supplying the buffer material 120A illustrated in FIGS. 6 and 7 and in the step of supplying the cladding material 131A illustrated in FIG. 8.

Figure 14A:
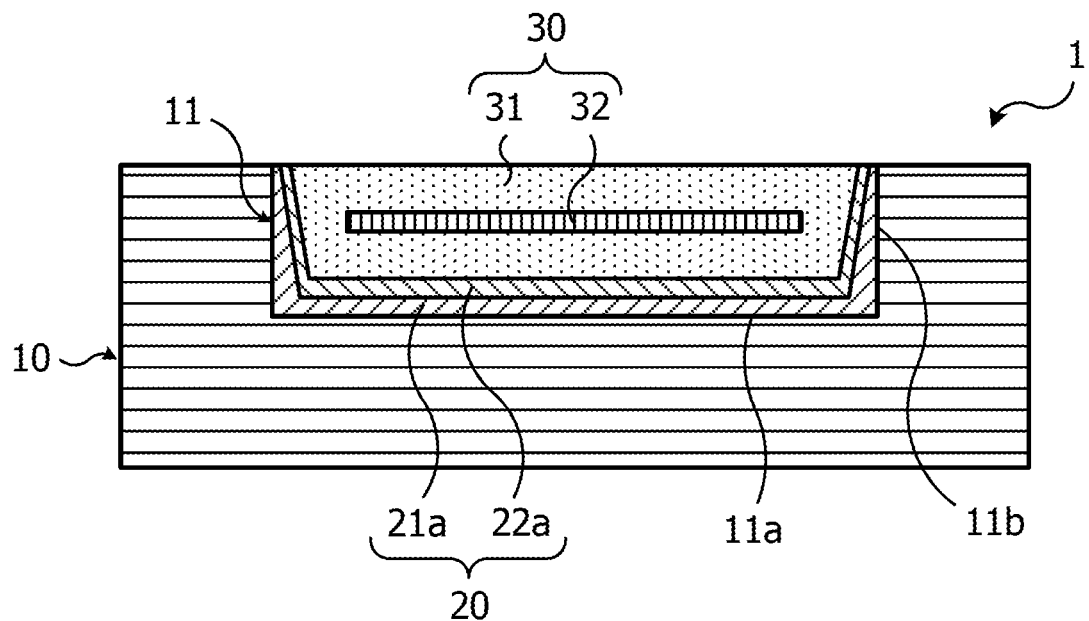
FIGS. 14A and 14B each illustrate a second configuration example of the optical waveguide substrate according to the fourth embodiment.
Figure 14B:
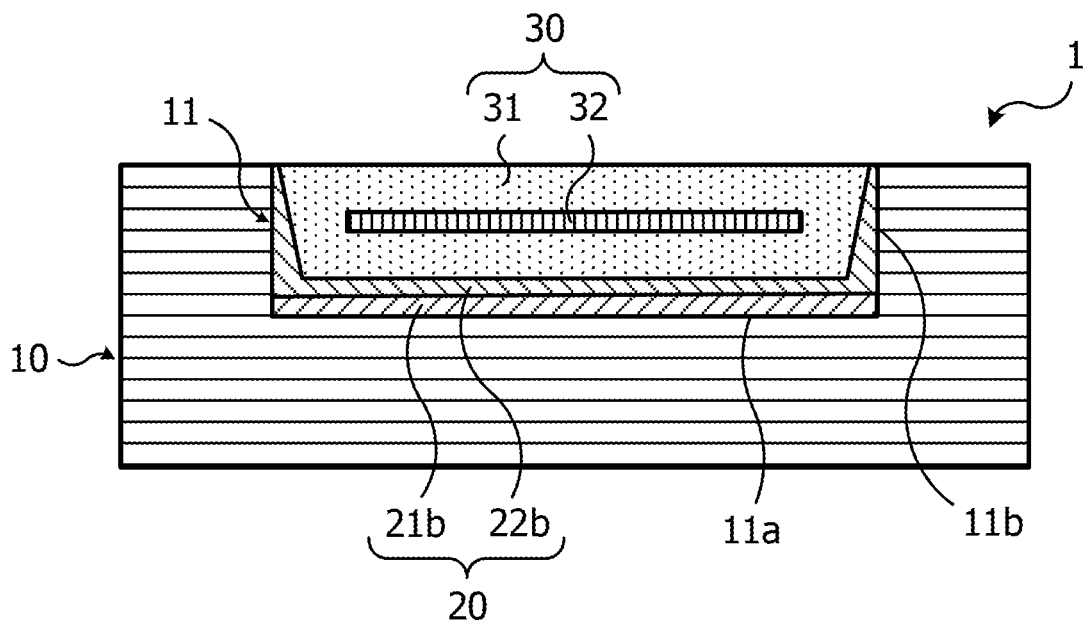

FIGS. 14A and 14B each illustrate a second configuration example of the optical waveguide substrate according to the fourth embodiment. FIGS. 14A and 14B each schematically illustrate a main-part cross-sectional view of the second configuration example of the optical waveguide substrate.

The buffer layer 20 of the optical waveguide substrate 1 described in the above first embodiment as well as the buffer layers 120 of the optical waveguide substrates 100, 100a, and 100b described in the above second, third, and fourth embodiments may have a multilayer structure.

With the optical waveguide substrate 1 described in the above first embodiment taken as an example, the buffer layer 20 of the optical waveguide substrate 1 may employ multilayer structures as illustrated in FIGS. 14A and 14B, for example.

The buffer layer 20 illustrated in FIG. 14A has: a lower layer portion 21a that is formed on the bottom surface 11a and the wall surface 11b of the recess 11 of the substrate 10 to cover the bottom surface 11a and wall surface 11b; and an upper layer portion 22a that is formed on the lower layer portion 21a to cover the lower layer portion 21a. The lower layer portion 21a is disposed in contact with the bottom surface 11a and wall surface 11b of the recess 11 and the upper layer portion 22a is disposed in contact with the cladding layer 31 of the optical waveguide 30.

For the lower layer portion 21a and the upper layer portion 22a of the buffer layer 20 illustrated in FIG. 14A, the same resin material may be used or different resin materials may be used. In a case where resin materials different from each other are used for the lower layer portion 21a and the upper layer portion 22a, a resin material having a favorable adhesion with the substrate 10 is used for the lower layer portion 21a and a resin material having a favorable adhesion with the lower layer portion 21a and cladding layer 31 is used for the upper layer portion 22a, for example. In this case, resin materials that make the lower layer portion 21a and the upper layer portion 22a have coefficients of thermal expansion between the coefficients of thermal expansion of the substrate 10 and the cladding layer 31 are used, for example.

In the case of the buffer layer 20 having such a lower layer portion 21a and upper layer portion 22a, resin materials may be selected for the lower layer portion 21a and the upper layer portion 22a in consideration of adhesion and a difference in coefficient of thermal expansion with respect to each portion depending on the combination of materials used for the substrate 10 and the cladding layer 31. This makes it possible to achieve an optical waveguide substrate 1 having high quality and reliability that is capable of effectively suppressing occurrence of peeling or cracking due to lack of adhesion with the substrate 10 and the cladding layer 31 and differences in coefficient of thermal expansion therefrom.

On the other hand, the buffer layer 20 illustrated in FIG. 14B has: a lower layer portion 21b that is formed on the bottom surface 11a of the recess 11 of the substrate 10 to cover the bottom surface 11a; and an upper layer portion 22b that is formed on the lower layer portion 21b and on the wall surface 11b of the recess 11 to cover the lower layer portion 21b and the wall surface 11b. The lower layer portion 21b is disposed in contact with the bottom surface 11a of the recess 11 and the upper layer portion 22b is disposed in contact with the wall surface 11b of the recess 11 and the cladding layer 31 of the optical waveguide 30.

For the lower layer portion 21b and the upper layer portion 22b of the buffer layer 20 illustrated in FIG. 14B, the same resin material may be used or different resin materials may be used. In a case where resin materials different from each other are used for the lower layer portion 21b and the upper layer portion 22b, a resin material having a favorable adhesion with the substrate 10 is used for the lower layer portion 21b and a resin material having a favorable adhesion with the lower layer portion 21b, the cladding layer 31, and the substrate 10 is used for the upper layer portion 22b, for example. In this case, resin materials that make the lower layer portion 21b and the upper layer portion 22b have coefficients of thermal expansion between the coefficients of thermal expansion of the substrate 10 and the cladding layer 31 are used, for example.

In the case of the buffer layer 20 having such a lower layer portion 21b and upper layer portion 22b, resin materials may be selected for the lower layer portion 21b and the upper layer portion 22b in consideration of adhesion and difference in coefficient of thermal expansion with respect to each portion depending on the combination of materials used for the substrate 10 and the cladding layer 31. This makes it possible to achieve an optical waveguide substrate 1 having high quality and reliability that is capable of effectively suppressing occurrence of peeling or cracking due to lack of adhesion with the substrate 10 and the cladding layer 31 and differences in coefficient of thermal expansion therefrom.

The buffer layer 20 employing a multilayer structure as described above is formed for example by supplying and curing resin materials for the lower layer portion 21a, 21b, and then supplying and curing resin materials for the upper layer portion 22a, 22b, in accordance with the example of the step of supplying a buffer material 120A illustrated in FIG. 7. Carrying out the supply twice for the resin materials for the buffer layer 20 makes it possible to suppress generation of a portion not covered with the resin materials in the bottom surface 11a and wall surface 11b of the recess 11. In the case where the supply is carried out twice for different resin materials, it is possible to adjust the thickness of the resin material formed by each supply to a thickness depending on the coefficient of thermal expansion of each layer obtained after the curing, making it possible to even more appropriately control the thermal behavior of the entire buffer layer 20.

In the case of employing a multilayer structure for the buffer layer 20, the number of layers is not limited to two as illustrated in FIGS. 14A and 14B, but may be three or more. In a case where the buffer layer 20 is formed with a multilayer structure of three layers or more as well, a resin material used for each layer is selected in consideration of adhesion and coefficient of thermal expansion of each layer, as described above.

It is possible to employ a multilayer structure for the buffer layers 120 of the optical waveguide substrates 100, 100a, and 100b described in the second, third, and fourth embodiments as well, like the examples illustrated in FIGS. 14A and 14B.

Figure 15A:
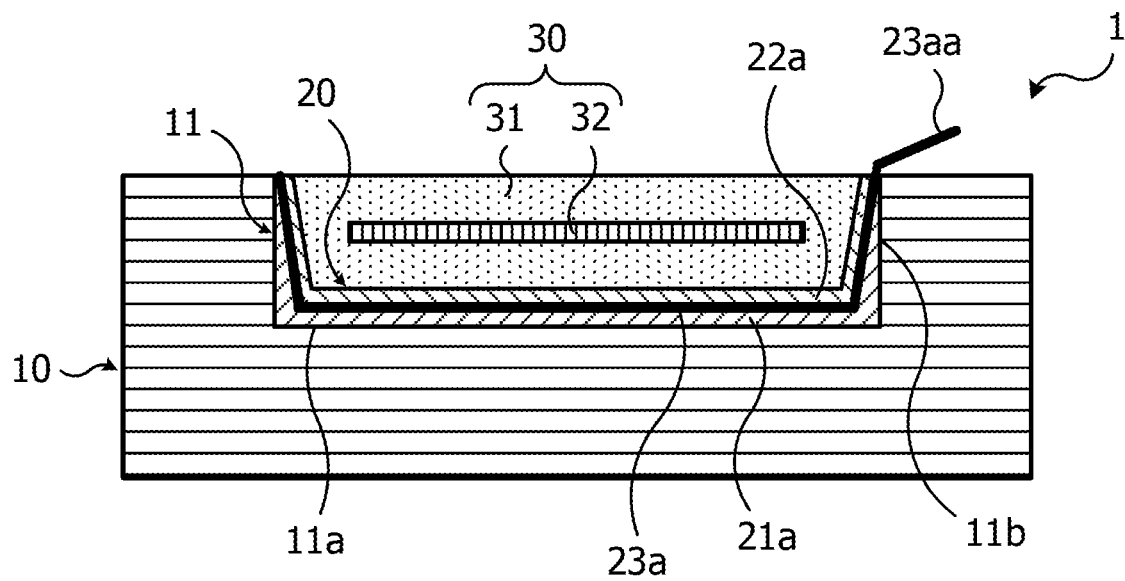
FIGS. 15A and 15B each illustrate a third configuration example of the optical waveguide substrate according to the fourth embodiment.
Figure 15B:
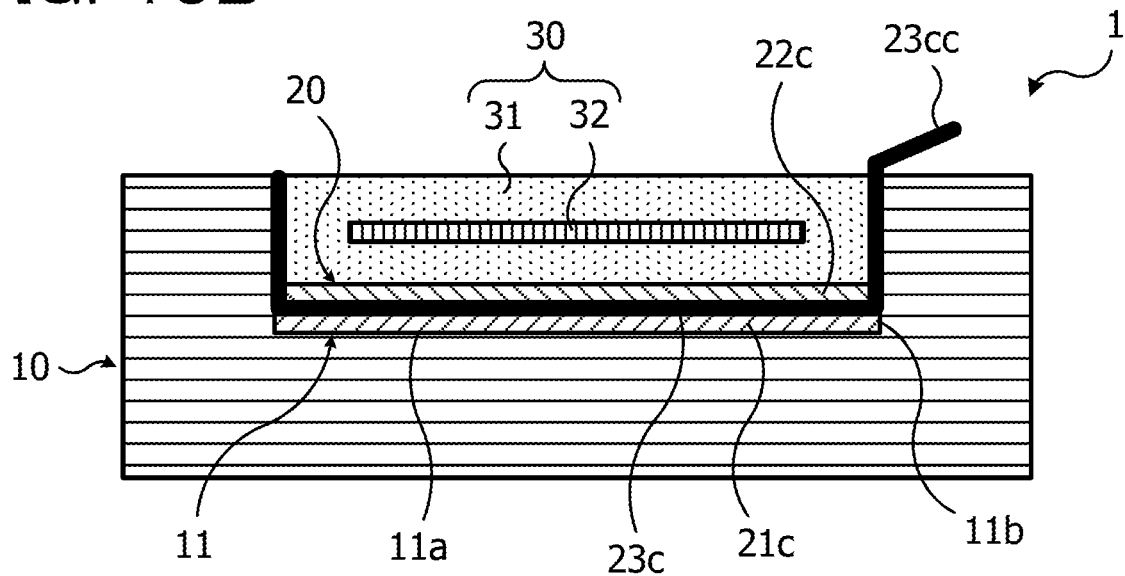

FIGS. 15A and 15B each illustrate a third configuration example of the optical waveguide substrate according to the fourth embodiment. FIGS. 15A and 15B each schematically illustrate a main-part cross-sectional view of the third configuration example of the optical waveguide substrate.

The buffer layer 20 of the optical waveguide substrate 1 described in the above first embodiment as well as the buffer layers 120 of the optical waveguide substrates 100, 100a, and 100b described in the above second, third, and fourth embodiments may have a multilayer structure as described above and a sheet material may further be interposed in an inner layer.

With the optical waveguide substrate 1 described in the above first embodiment taken as an example, a multilayer structure having a lower layer portion 21a and an upper layer portion 22a as illustrated in FIG. 14A is employed for the buffer layer 20 and a sheet material 23a as illustrated in FIG. 15A is interposed between the lower layer portion 21a and the upper layer portion 22a, for example. For the sheet material 23a, used is a resin sheet or a sheet-shaped net material formed of wires of Cu or the like, for example. For the sheet material 23a, used is a material having durability against heat applied to the optical waveguide substrate 1. The sheet material 23a may have a buffer function between the substrate 10 and the optical waveguide 30, like the lower layer portion 21a and the upper layer portion 22a sandwiching the sheet material 23a.

The buffer layer 20 including the sheet material 23a as illustrated in FIG. 15A is obtained by forming the lower layer portion 21a, the sheet material 23a, and the upper layer portion 22a in this order inside the recess 11 of the substrate 10, for example. For the buffer layer 20, a member having a double-sided tape structure with resin layers disposed in advance, which become the lower layer portion 21a and the upper layer portion 22a, on opposite faces of the sheet material 23a as described above may be used. The buffer layer 20 as illustrated in FIG. 15A may be formed by applying such a member to the bottom surface 11a and wall surface 11b of the recess 11 of the substrate 10.

The sheet material 23a may have a tab portion 23aa which is extended from a portion (interposed portion) sandwiched between the lower layer portion 21a and the upper layer portion 22a and pulled out of the recess 11, as illustrated in FIG. 15A. Disposing such a tab portion 23aa makes it possible to peel and remove the optical waveguide 30 from the recess 11 of the substrate 10 by pulling up the tab portion 23aa. This makes it possible to form a new optical waveguide inside the recess 11 of the substrate 10 from which the optical waveguide 30 has been removed by using the tab portion 23aa, in accordance with the example of FIGS. 8 to 10. The sheet material 23a may be utilized for repairing the optical waveguide substrate 1 in this manner.

The sheet material 23a as described above or a sheet material 23a having a tab portion 23aa may be disposed between the lower layer portion 21b and the upper layer portion 22b and between the upper layer portion 22b and the wall surface 11b as illustrated in FIG. 14B.

The buffer layer 20 illustrated in FIG. 15B includes: a lower layer portion 21c and an upper layer portion 22c; and a sheet material 23c sandwiched therebetween. The lower layer portion 21c and the upper layer portion 22c are disposed along the bottom surface 11a of the recess 11 of the substrate 10. The sheet material 23c has a part disposed between the lower layer portion 21c and the upper layer portion 22c and another part disposed on the wall surface 11b of the recess 11. The lower layer portion 21c is disposed in contact with the bottom surface 11a of the recess 11 and the upper layer portion 22c is disposed in contact with the cladding layer 31 of the optical waveguide 30.

For the sheet material 23c, used is a resin material having a buffer function between the substrate 10 and the optical waveguide 30, like the lower layer portion 21c and the upper layer portion 22c, for example. Disposing the sheet material 23c with a buffer function makes it possible to omit the formation of a resin material with fluidity onto the wall surface 11b of the recess 11.

The buffer layer 20 including the sheet material 23c as illustrated in FIG. 15B is obtained by forming the lower layer portion 21c, the sheet material 23c, and the upper layer portion 22c in this order inside the recess 11 of the substrate 10, for example. For the buffer layer 20, a member having a double-sided tape structure with resin layers disposed in advance, which become the lower layer portion 21c and the upper layer portion 22c, on opposite faces of the sheet material 23c as described above may be used. The buffer layer 20 as illustrated in FIG. 15B may be formed by applying such a member to the bottom surface 11a and wall surface 11b of the recess 11 of the substrate 10.

The sheet material 23c may have a tab portion 23cc pulled out of the recess 11 as illustrated in FIG. 15B. Disposing such a tab portion 23cc makes it possible to remove (peel off) the optical waveguide 30 by using the tab portion 23cc and to form (repair) a new optical waveguide into the recess 11 after the removal.

It is possible to employ a multilayer structure including a sheet material in an inner layer for the buffer layers 120 of the optical waveguide substrates 100, 100a, and 100b described in the second, third, and fourth embodiments, in accordance with the example as illustrated in FIGS. 15A and 15B.

Fifth Embodiment

An example of a method of repairing an optical waveguide substrate will be described as a fifth embodiment.

Figure 16:
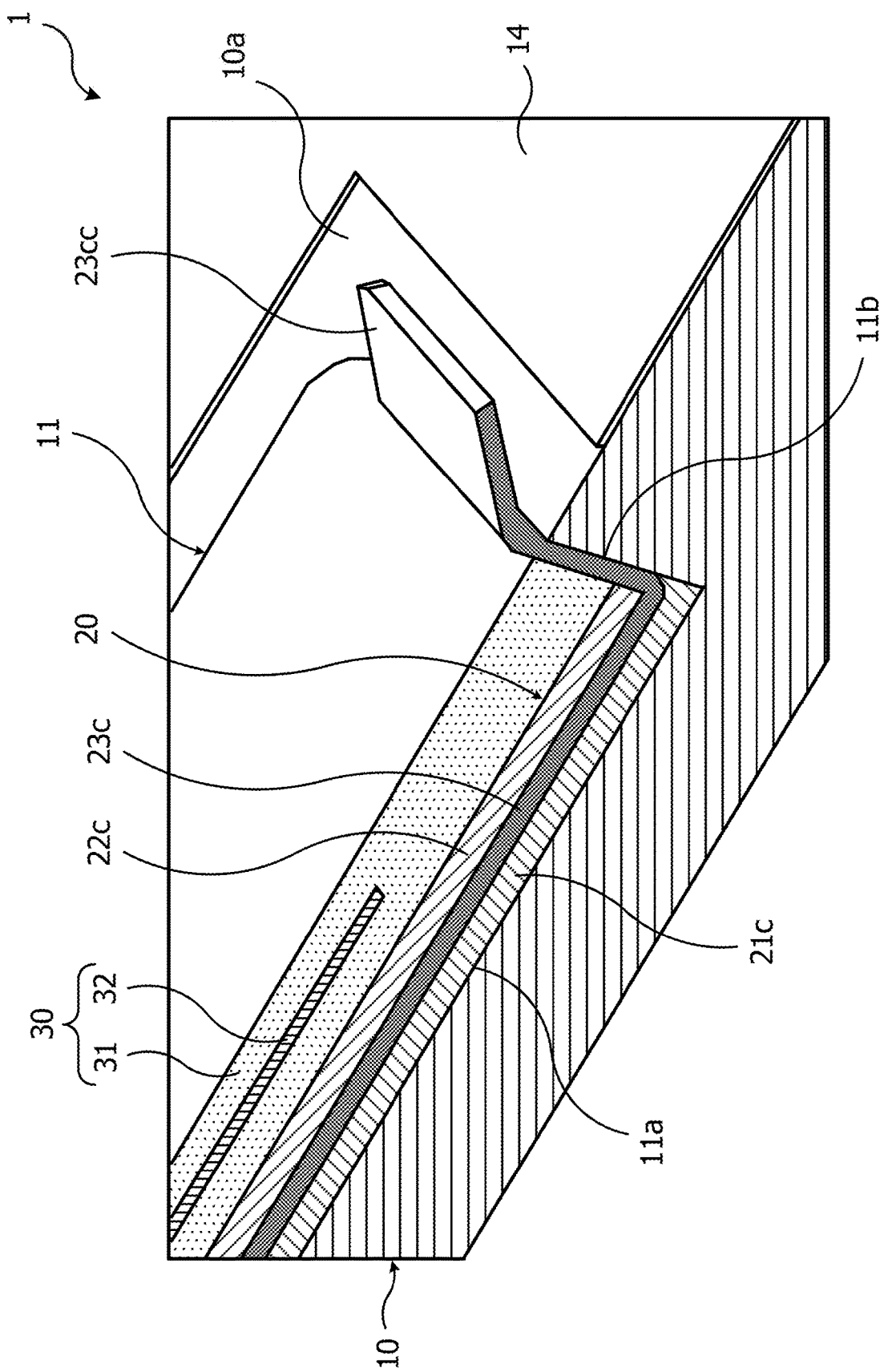
FIG. 16 illustrates an example of an optical waveguide substrate according to a fifth embodiment.

FIG. 16 illustrates an example of an optical waveguide substrate according to the fifth embodiment. FIG. 16 schematically illustrates a main-part cross-sectional perspective view of the example of the optical waveguide substrate.

FIG. 16 illustrates an example of an optical waveguide substrate 1 employing a buffer layer 20 as illustrated in FIG. 15B.

Specifically, for example, in the optical waveguide substrate 1 illustrated in FIG. 16, an optical waveguide 30 having a cladding layer 31 and a core layer 32 is disposed inside a recess 11 of a substrate 10. A buffer layer 20 having a lower layer portion 21c and an upper layer portion 22c and a sheet material 23c sandwiched therebetween is disposed between a bottom surface 11a and wall surface 11b of the recess 11 and the optical waveguide 30. The sheet material 23c has a buffer function like the lower layer portion 21c and the upper layer portion 22c and has a tab portion 23cc which is extended from a portion (interposed portion) sandwiched between the lower layer portion 21c and the upper layer portion 22c and pulled out of the recess 11.

FIG. 16 illustrates as an example the optical waveguide substrate 1 having a protection film 14 such as solder resist disposed on the upper surface 10a of the substrate 10.

Figure 17:
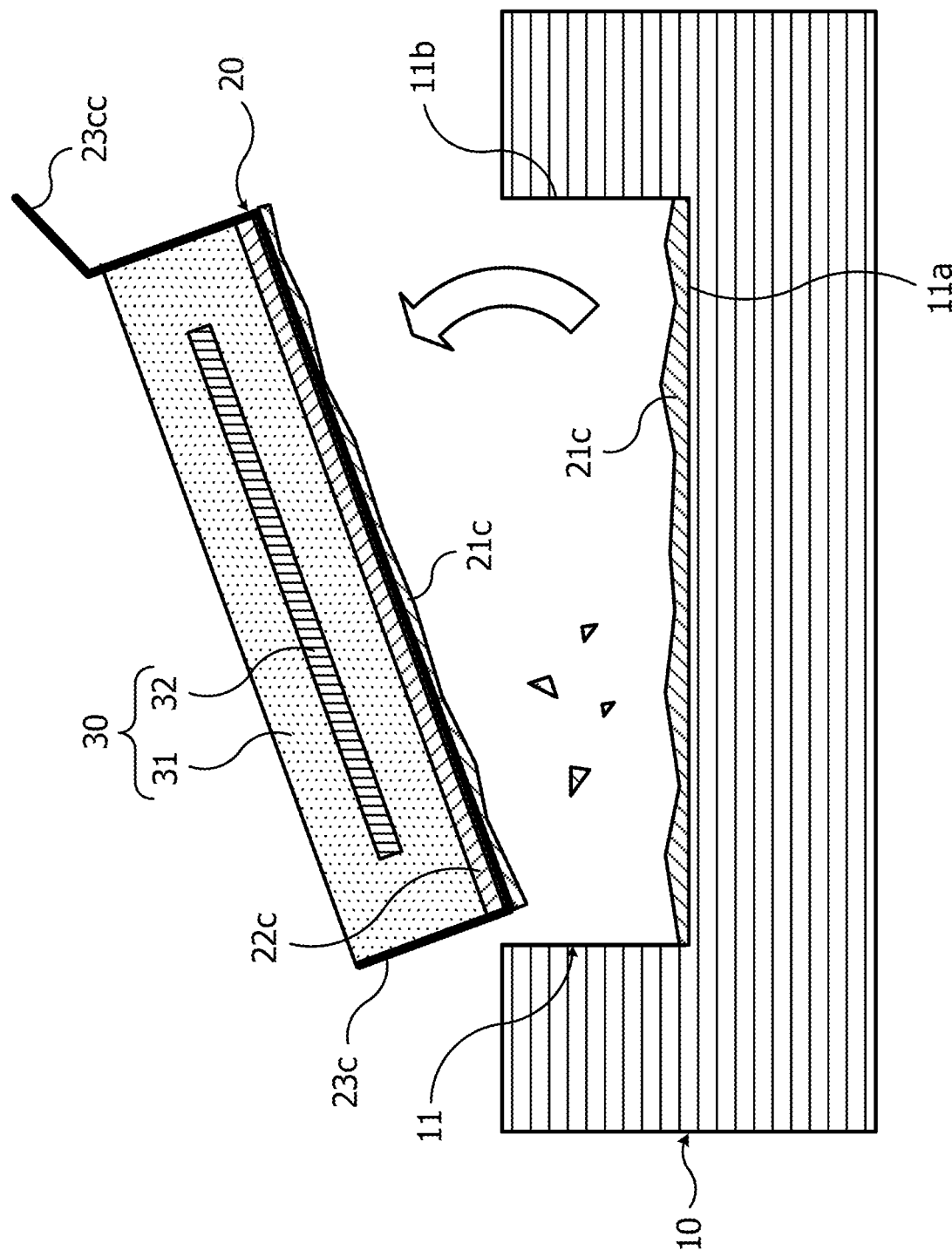
FIG. 17 illustrates an example of a method of repairing the optical waveguide substrate according to the fifth embodiment (Part 1)
Figure 18:
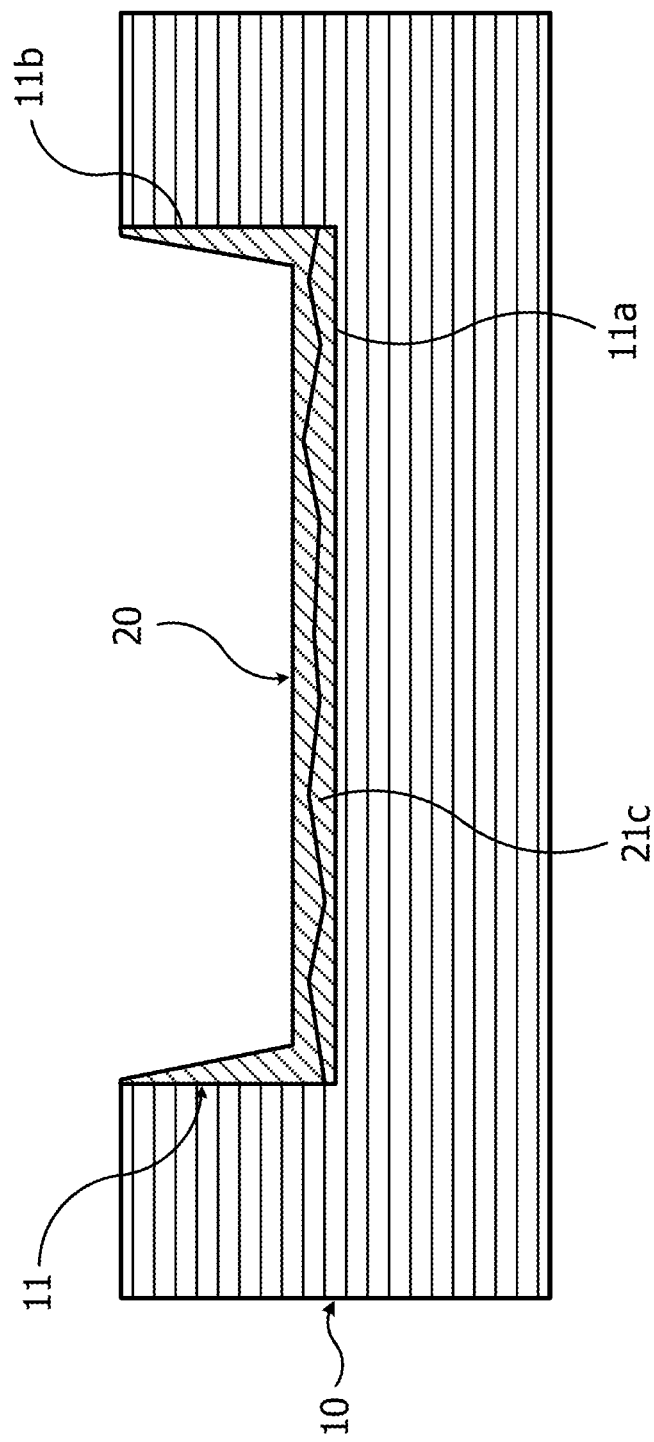
FIG. 18 illustrates the example of the method of repairing the optical waveguide substrate according to the fifth embodiment (Part 2)
Figure 19:
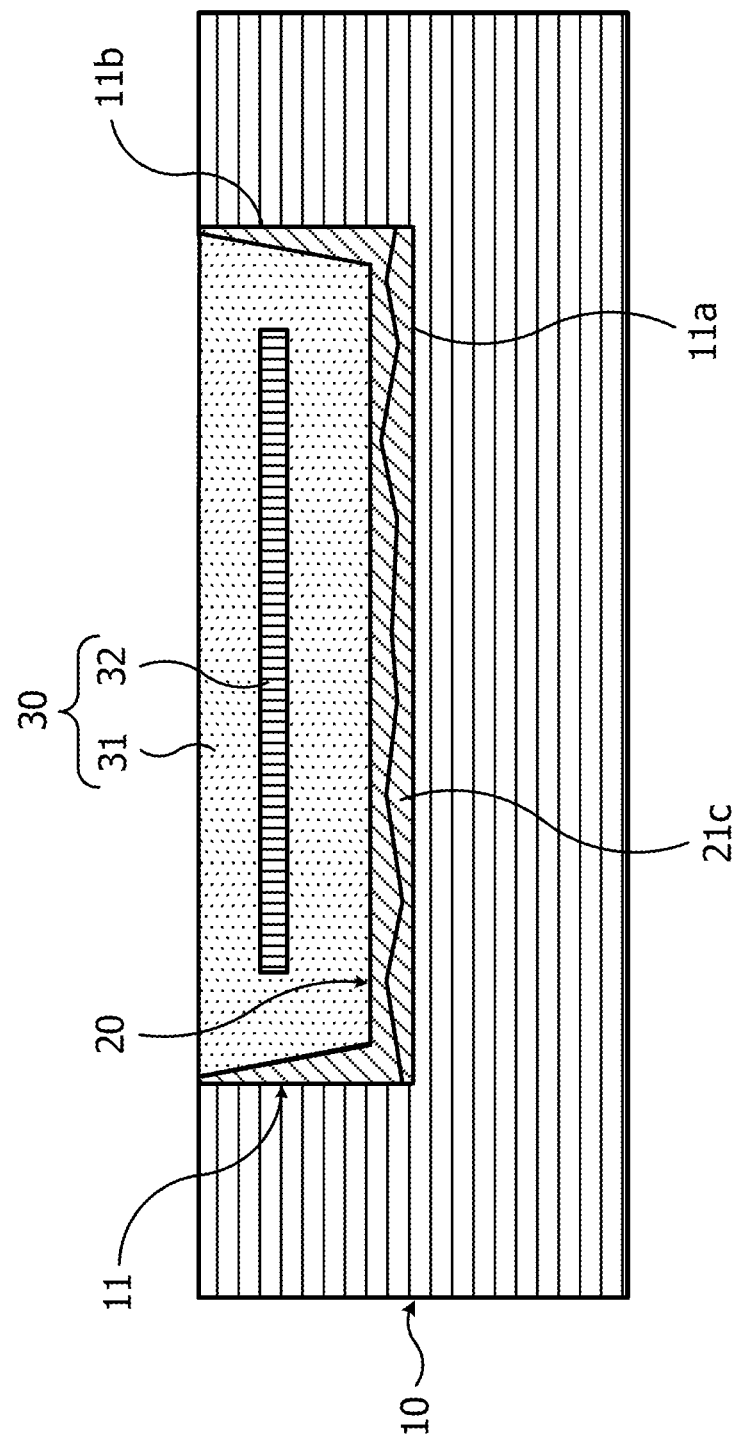
FIG. 19 illustrates the example of the method of repairing the optical waveguide substrate according to the fifth embodiment (Part 3)

FIGS. 17 to 19 illustrate an example of the method of repairing an optical waveguide substrate according to the fifth embodiment. FIGS. 17 to 19 each schematically illustrate a main-part cross-sectional view of each step for the repair.

In a case where for example the optical waveguide 30 has failure and the optical waveguide 30 is to be repaired in the optical waveguide substrate 1 having the configuration as illustrated in FIG. 16, a method as illustrated in FIGS. 17 to 19 is employed, for example.

First, the tab portion 23cc of the sheet material 23c, which is pulled out of the recess 11 of the substrate 10, is pulled up, so that the optical waveguide 30 having failure is peeled off and removed from the recess 11 of the substrate 10, as illustrated in FIG. 17. When peeled off from the recess 11, the optical waveguide 30 having failure is peeled off from the recess 11 together with the upper layer portion 22c of the buffer layer 20 and the sheet material 23c, or together with the upper layer portion 22c and the sheet material 23c and with part or all of the lower layer portion 21c.

FIG. 17 schematically illustrates as an example how the optical waveguide 30 having failure is peeled off from the recess 11 together with the upper layer portion 22c of the buffer layer 20 and the sheet material 23c and with part of the lower layer portion 21c. In this case, the other part of the lower layer portion 21c, which was not peeled off, remains on the bottom surface 11a of the recess 11.

After the optical waveguide 30 having failure is peeled off, a new buffer layer 20 is formed as illustrated in FIG. 18. The new buffer layer 20 may be formed in accordance with the example of FIGS. 6 and 7. Specifically, a resin material having fluidity, which becomes a buffer layer 20, is supplied into the recess 11 of the substrate 10 with the position of the supply nozzle being adjusted, and is then cured to form a new buffer layer 20 on the bottom surface 11a and wall surface 11b of the recess 11.

After the optical waveguide 30 having failure is peeled off, part of the lower layer portion 21c, which was not peeled off, may remain as illustrated in FIG. 18 (and FIG. 17), for example. In this case, unevenness may exist on the surface of the remaining lower layer portion 21c. For example, even when unevenness exists on the surface of the remaining lower layer portion 21c as above, a buffer layer 20 with a smooth surface is newly formed as illustrated in FIG. 18 by supplying a resin material having fluidity. Forming a new buffer layer 20 by further supplying a resin material on the remaining lower layer portion 21c makes it possible to increase the thickness of the buffer layer 20 and to even further enhance the effect of relaxing stress generated between the substrate 10 and the optical waveguide 30.

Although not illustrated, a buffer layer 20 having a multilayer structure as illustrated in FIG. 14A or 14B may be formed as a new buffer layer 20. Alternatively, as a new buffer layer 20, a buffer layer 20 having a multilayer structure including a sheet material 23a or a sheet material 23c as illustrated in FIG. 15A or 15B may be formed.

After the new buffer layer 20 is formed, an optical waveguide 30 having a cladding layer 31 and a core layer 32 is newly formed as illustrated in FIG. 19. A new optical waveguide 30 may be formed in accordance with the example of FIGS. 8 to 10. Specifically, a resin material, which becomes a new cladding layer 31, is supplied from the nozzle into the recess 11 in which the new buffer layer 20 has been formed, and then the nozzle is inserted into the resin material to supply a resin material, which becomes a new core layer 32, and these resin materials supplied are cured by irradiation of light, or the like. In this way, a new optical waveguide 30 as illustrated in FIG. 19 is formed.

In this manner, for example, a buffer layer 20 having a lower layer portion 21c and an upper layer portion 22c and a sheet material 23c which is sandwiched therebetween and part of which is pulled out of the recess 11 as a tab portion 23cc is disposed inside the recess 11 of the substrate 10 (FIG. 16). By utilizing the sheet material 23c of the buffer layer 20, the optical waveguide 30 having failure in the optical waveguide substrate 1 is repaired as illustrated in FIGS. 17 to 19. Since it is possible to repair only the optical waveguide 30 having failure among the substrate 10 and the optical waveguide 30 of the optical waveguide substrate 1, the entire optical waveguide substrate 1, which is relatively expensive, does not have to be replaced.

Disposing the buffer layer 20 including the sheet material 23c makes it possible to achieve an optical waveguide substrate 1 having high quality and reliability and also achieve an optical waveguide substrate 1 that allows the optical waveguide 30 to be repaired by utilizing the sheet material 23c when the optical waveguide 30 has failure.

Regarding the buffer layers 120 of the optical waveguide substrates 100, 100a, and 100b described in the second, third, and fourth embodiments as well, employing the structure including in an inner layer a sheet material part of which is pulled out of the recess 11 makes it possible to repair the optical waveguide 130.

Sixth Embodiment

The optical waveguide substrates 1, 1a, 1b, 1c, 100, 100a, 100b, and the like and the optical devices 300, 300a, and the like as described above may be mounted on components such as active optical cables (AOCs) and various information and communication technology (ICT) devices which perform transmission of electrical signals using electrical wiring and transmission of optical signals using optical wiring. For example, they may be mounted on various ICT devices such as computers (personal computers, supercomputers, servers, and the like), smartphones, mobile phones, tablet terminals, sensors, cameras, audio devices, measuring devices, inspecting devices, and manufacturing devices.

A component or device as described above on which the optical devices 300, 300a, and the like including the optical waveguide substrates 1, 1a, 1b, 1c, 100, 100a, 100b, and the like as well as the optical waveguide substrates 1, 1a, 1b, 1c, 100, 100a, 100b, and the like and the optical devices 300, 300a, and the like are mounted is herein referred to as an "optical instrument".

FIG. 20 illustrates an optical instrument according to a sixth embodiment. FIG. 20 schematically illustrates the optical instrument.

As illustrated in FIG. 20, for example, an optical device 300 (FIG. 11) using an optical waveguide substrate 100 as described in the above third embodiment is mounted (incorporated) inside a body 510 of an optical instrument 500.

In the optical device 300, a buffer layer 120 considering adhesion and the coefficient of thermal expansion $CTE_B$ as described above is disposed between an optical waveguide 130 inside a recess 111 of a circuit substrate 110 included in the optical waveguide substrate 100 and a bottom surface 111a and wall surface 111b of the recess 111. This makes it possible to enhance the durability against heat applied to the optical waveguide substrate 100 and the optical device 300 and to suppress occurrence of peeling or cracking between the bottom surface 111a and wall surface 111b of the recess 111 and the cladding layer 131. As a result, the optical device 300 having high quality and reliability with which a decrease in mechanical strength, displacement of the optical waveguide 130 relative to the light-emitting element 310 and the light-receiving element 320, an increase in transmission loss of optical signals, and the like are suppressed is achieved.

An optical instrument 500 having high quality and reliability on which such an optical device 300 is mounted is achieved.

Although the optical instrument 500 on which the optical device 300 is mounted is described as an example, the optical waveguide substrates 1, 1a, 1b, 1c, 100, 100a, 100b, and the like and the optical device 300a, and the like may be similarly mounted on various optical instruments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical waveguide substrate comprising:
   a substrate that includes a recess;
   a buffer layer disposed on a bottom surface and a wall surface of the recess; and
   an optical waveguide disposed inside the recess with the buffer layer interposed therebetween and having a cladding layer disposed on the buffer layer and a core layer disposed inside the cladding layer,
   the core layer is embedded in the cladding layer in such a manner that a part of the recess, which is located at a height of an upper surface of the substrate, is covered entirely by the cladding layer.

2. The optical waveguide substrate according to claim 1, wherein the buffer layer includes:
   a first portion disposed along the bottom surface; and
   a second portion disposed to rise up from the first portion along the wall surface.

3. The optical waveguide substrate according to claim 1, wherein a coefficient of thermal expansion of the buffer layer is between a coefficient of thermal expansion of the substrate and a coefficient of thermal expansion of the cladding layer.

4. The optical waveguide substrate according to claim 1, wherein the buffer layer includes:
   a first layer disposed inside the recess and being in contact with the substrate; and
   a second layer disposed inside the recess and being in contact with the optical waveguide.

5. The optical waveguide substrate according to claim 4, wherein the buffer layer further includes: a third layer having a tab portion extended from an interposed portion disposed between the first layer and the second layer inside the recess and pulled out of the recess.

6. A method of manufacturing an optical waveguide substrate, comprising:

forming a buffer layer on a bottom surface and a wall surface of a recess disposed in a substrate; and forming an optical waveguide inside the recess with the buffer layer interposed therebetween, the optical waveguide having a cladding layer disposed on the buffer layer and a core layer disposed inside the cladding layer, the core layer is embedded in the cladding layer in such a manner that a part of the recess, which is located at a height of an upper surface of the substrate, is covered entirely by the cladding layer.

7. The method of manufacturing an optical waveguide substrate according to claim 6, wherein in the forming a buffer layer, the buffer layer is formed by supplying a buffer material with fluidity onto the wall surface, causing part of the supplied buffer material to remain on the wall surface, and causing other part of the buffer material to flow from the wall surface onto the bottom surface; and curing the part and the other part of the supplied buffer material.

* * * * *